(12) United States Patent
Hing

(10) Patent No.: US 10,069,808 B2
(45) Date of Patent: Sep. 4, 2018

(54) METHODS AND SYSTEMS FOR PROVIDING A CUSTOMIZED NETWORK

(71) Applicant: Eileen Chu Hing, Cambridge, MA (US)

(72) Inventor: Eileen Chu Hing, Cambridge, MA (US)

(*) Notice: Subject to any disclaimer, the term of this patent is extended or adjusted under 35 U.S.C. 154(b) by 207 days.

(21) Appl. No.: 15/063,875

(22) Filed: Mar. 8, 2016

(65) Prior Publication Data

US 2016/0191474 A1 Jun. 30, 2016

Related U.S. Application Data

(63) Continuation-in-part of application No. 13/440,924, filed on Apr. 5, 2012, now Pat. No. 9,177,337, which is a continuation-in-part of application No. 10/553,715, filed as application No. PCT/US2004/011878 on Apr. 16, 2004, now Pat. No. 8,176,318.

(60) Provisional application No. 60/468,681, filed on May 7, 2003, provisional application No. 60/463,201, filed on Apr. 16, 2003.

(51) Int. Cl.
*H04L 29/06* (2006.01)
*G06F 9/455* (2018.01)
*G06Q 30/04* (2012.01)

(52) U.S. Cl.
CPC ...... *H04L 63/0471* (2013.01); *G06F 9/45558* (2013.01); *G06Q 30/04* (2013.01); *H04L 63/1408* (2013.01); *G06F 2009/4557* (2013.01); *G06F 2009/45587* (2013.01); *G06F 2009/45595* (2013.01)

(58) Field of Classification Search
CPC .................................................. H04L 63/0471
USPC ............................................................ 713/154
See application file for complete search history.

(56) References Cited

U.S. PATENT DOCUMENTS

| | | | | |
|---|---|---|---|---|
| 5,961,582 | A | * 10/1999 | Gaines | ................. G06F 9/4843 718/1 |
| 6,311,180 | B1 | 10/2001 | Fogarty | |
| 7,117,507 | B2 | * 10/2006 | Hostetter | ............ G06F 9/44557 712/208 |
| 7,200,551 | B1 | 4/2007 | Senez | |
| 7,281,017 | B2 | * 10/2007 | Hostetter | .................. G06F 8/65 |
| 2002/0152137 | A1 | 10/2002 | Lindquist et al. | |
| 2004/0128670 | A1 | 7/2004 | Robinson et al. | |

(Continued)

OTHER PUBLICATIONS

International Application No. PCT/US2012/049877, International Search Report and Written Opinion dated Nov. 19, 2012, 11 pgs.

*Primary Examiner* — Longbit Chai
(74) *Attorney, Agent, or Firm* — Stamoulis & Weinblatt LLC

(57) ABSTRACT

A computer implemented method and apparatus is disclosed that includes programming to generate, spawn, or invoke a mother script in a virtual computing environment residing on a physical server. The methods and systems dynamically generate, spawn, or invoke at least one virtual machine embedded with one or more daughter scripts or virtual scripts containing adaptive instruction sets based on a first request, in the form of one or more virtual atoms, where each virtual atom has at least one assigned task and is allowed to connect to other virtual atoms to create one or more virtual computing systems or networks, in the form of one or more virtual molecules.

20 Claims, 11 Drawing Sheets

(56) References Cited

U.S. PATENT DOCUMENTS

| | | |
|---|---|---|
| 2006/0230124 A1 | 10/2006 | Belfiore et al. |
| 2007/0143398 A1 | 6/2007 | Graham |
| 2008/0244582 A1 | 10/2008 | Brown et al. |
| 2011/0265164 A1 | 10/2011 | Lucovsky et al. |

* cited by examiner

Virtual Molecule

METHODS AND SYSTEMS FOR PROVIDING A CUSTOMIZED NETWORK

CROSS-REFERENCE TO RELATED APPLICATIONS

This application is a continuation-in-part of U.S. application Ser. No. 13/440,924, which is a continuation-in-part of U.S. application Ser. No. 10/553,715, filed on Apr. 12, 2007, which is the National Stage of International Application No. PCT No. PCT/US04/11878, filed Apr. 16, 2004, which claims priority on U.S. Provisional Patent Application Ser. No. 60/468,681, filed on May 7, 2003, and U.S. Provisional Patent Application Ser. No. 60/463,201, filed on Apr. 16, 2003, the disclosures of which are hereby incorporated in their entirety.

BACKGROUND

The use of communications networks to collect, operate on, or transfer information using the Internet is widespread. These networks are generally accessed through use of desktop and laptop computers (PCs) and also through wireless networks, such as through mobile devices, cellular telephones, and Internet of Things (IoT) devices. Nevertheless, many of these available networks do not allow for adequate secure transfer of data (i.e., encryption), flexibility in how the data is grouped and shared, and/or a way of connecting and combining disparate and legacy databases and systems in a resilient, adaptive fashion.

Methods of data exchange used by, for example, businesses and consumers lack adequate security and speed.

The development of web services in the Application Programming Interface or Application Program Interface (API) economy lacks adequate security.

In addition, conventional data exchange frameworks generally use complex static architecture, requiring proprietary networks. This complexity provides less flexibility in grouping and manipulating data and systems, which makes it difficult for users to secure and customize their networks. Moreover, traditional and currently known networks are not configured to handle the exchange and processing of small pieces of data handled by virtual machines that interconnect with legacy systems.

Accordingly, there is a need for an apparatus, systems, and methods that may be configured to capture, exchange and process small pieces of information that are adaptable, non-static, and dynamic such that the data may be collected for use by one or more legacy systems or be stored in one or more physical servers. There is a need to secure data in the cloud transmitted from IoT devices using resilient adaptable scalable networks and systems. Currently, many cybersecurity solutions for data storage and transmission utilize a reactive approach, implemented after a security breach. There is a need for a proactive approach to providing cybersecurity for data in networks and systems for businesses and consumers by using adaptive ephemeral systems, that is, to provide cybersecurity by making computerized systems behave like molecules using cybersecurity catalysts.

SUMMARY

A computer implemented method comprising programming to generate, spawn, or invoke a mother script in a virtual computing environment residing on a physical server is disclosed. In one aspect, the mother script dynamically generates, spawns, or invokes at least one virtual machine embedded with one or more daughter scripts or virtual scripts containing adaptive instruction sets based on a first request, in the form of one or more virtual atoms. Each virtual atom may have at least one assigned task and is allowed to connect to other virtual atoms to create one or more virtual computing systems or networks, in the form of one or more virtual molecules, to one of share data, processes, resources, and adaptive instruction sets, to dynamically process data and/or execute complex tasks based one of the first and a second request, in a virtual computing environment residing on a physical server. The one or more virtual atoms or one or more virtual molecules may be destroyed by themselves.

In one example, the at least one virtual machine embedded with adaptive instruction sets, resides on one of a microcontroller, sensor, USB flash drive, chip, module, server, and a device associated with the Internet of Things (IoT).

In another aspect, the programming containing adaptive instruction sets in one of embedded in a virtual machine or not embedded in a virtual machine, resides on one of a microcontroller, sensor, USB flash drive, chip, module, and a device associated with the Internet of Things (IoT) and invokes one or more mother scripts in the virtual computing environment residing on a physical server.

The method may also include virtual machines that encapsulate data in one of the same language and different languages. In another aspect, at least one set of adaptive instructions encapsulated within a virtual machine, spawns, generates, or invokes one or more other sets of adaptive instructions encapsulated in one or more other virtual machines.

In another example, at least one decryption agent, containing adaptive instruction sets, encapsulated within a virtual machine on a virtual computing environment residing on a physical server is invoked, spawned, or generated from a request to decrypt data from each virtual atom or virtual molecule. The method may also include that the decryption agent encapsulated within a virtual machine in the virtual computing environment residing on a physical server is dynamically generated by a set of adaptive instructions based on a request.

In yet another aspect, the data from each virtual atom may be stored within its own virtual memory or virtual database. In another example, the data is received and reassembled by a receptor, in the form of a virtual atom or virtual molecule, containing adaptive instruction sets encapsulated within a virtual machine, in the virtual computing environment residing on a physical server.

The receptor virtual atom or receptor virtual molecule may invoke an API in the virtual computing environment residing on a physical server to store the data into a physical database of a physical server. The one or more of the virtual atoms or virtual molecules in a virtual computing environment residing on a physical server may include a third party application embedded within the virtual machine.

In another aspect, the virtual machines are in a cloud-based environment. The virtual atoms or virtual molecules, containing adaptive instruction sets encapsulated within virtual machines, combine to form repeatable functional groups, in the form of additional virtual atoms or virtual molecules, chained together to capture a first set of data that is subsequently broken into small pieces of second data sequentially, across the repeatable functional group chain of additional virtual atoms or virtual molecules.

The method may also include each virtual machine includes its own operating system and virtual database, and the data is captured from an IoT device and the data is stored or transmitted into a disparate computing environment.

BRIEF DESCRIPTION OF THE DRAWINGS

The foregoing summary, as well as the following detailed description, is better understood when read in conjunction with the appended drawings. For the purpose of illustrating the implementations, there is shown in the drawings example constructions of the implementations; however, the implementations are not limited to the specific methods and instrumentalities disclosed. In the drawings.

DETAILED DESCRIPTION

Figure 1:
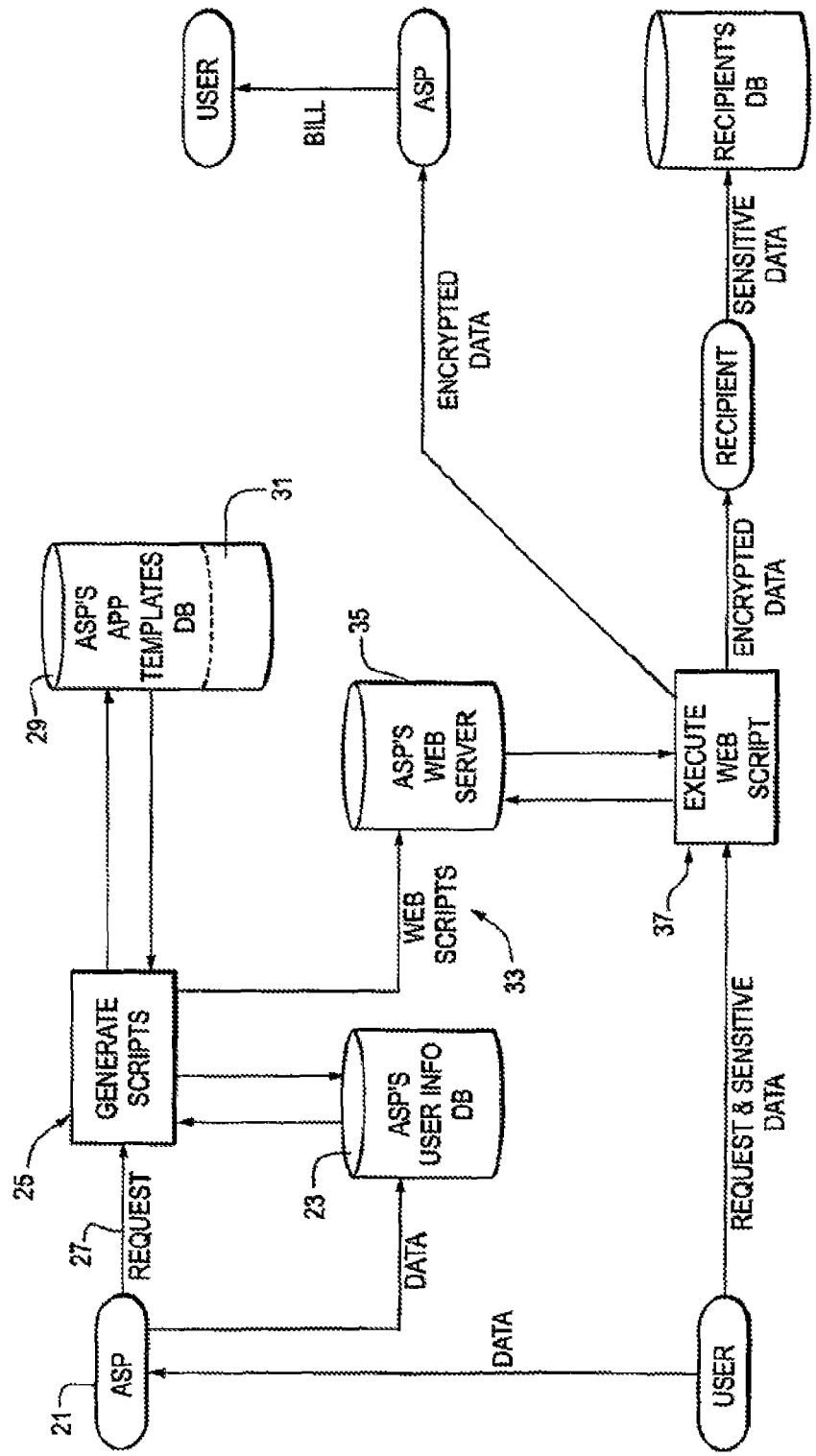
FIGS. 1-11 are schematics showing the steps of the method and system, and any corresponding computer readable medium of the implementations described herein.

A method, system, and computer-readable medium for collecting, storing, and transmitting data for any associated application, such as for medical or legal billing information, and/or providing consumers with goods and services, such as food items, consumer electronics, etc. is provided.

In one implementation, a customized application/software enhancement resides on top of an existing legacy system, allowing businesses to exchange data within internal corporate departments and between outside business partners. An application service provider ("ASP") is preferably associated with various operational aspects of the inventive system through a computer network. The data and program scripts are, in one implementation, stored at the ASP to minimize the hardware requirements for each user. The system is configured so that it can be continually updated and upgraded at the ASP level with little or no need to update local users' network hardware (servers), local hardware mobile devices, PCs, smart phones, media players, etc.), or software.

The ASP is simultaneously a data/information service, web developer, application or software provider, hosting service, data interface, and information technology support group. In some implementations, the ASP, including processing and storage capabilities may be implemented using what is commonly referred to as a cloud based computing system or simply as "the cloud". In cloud computing the processing and data resources used by the ASP may be abstracted among or across one or more computers and/or computer networks that make up the cloud. A provider of the ASP may contract with one or more cloud based computing service providers to allocate the computing and/or storage resources used to implement the various ASP services described herein. Examples of cloud computing services include Softlayer by IBM and S3 by Amazon.com.

Each user of the ASP may have its own portal provided by the ASP for gathering, grouping, executing, storing, encrypting, transmitting, receiving, validating, and/or decrypting data. For example, a merchant may have a portal with data and fields customized to that merchant's business. Specifically, a food vendor can have a portal customized to its menu and pricing such that users can order food pursuant to the network. The user enters information into the food vendor's portal through a customized user-interface and the data is encrypted for transmission to the food vendor. The customized user-interface may have popup menus providing options for the user to choose, e.g., main course, side dish, dessert, etc. The food vendor decrypts and validates the data, e.g., the food choices or credit card information, to process the order. Meanwhile, the system copies the data being transmitted for validation and backup and maintains a database with the status of the data transmission.

The ASP generates web scripts via agents, such as zotbots, which the user utilizes for entry, storing, and/or storage of data. These web scripts are stored by the ASP and are accessible to users. The system receives the data from the users and stores it into the system database and optionally in a user's database. In some implementations, the web scripts may be generated by what is referred to herein as a mother web script. The mother web script may dynamically generate one or more daughter web scripts based on data collected by the mother web script, data stored in the system database, or data stored in the user's database. The mother web script and/or daughter web scripts may provide the various user and merchant services described herein.

The ASP may further generate and provide services through one or more virtual machines. For example, the ASP may generate and maintain a virtual machine for some or all of the web scripts that are spawned or generated by the ASP. Whether or not a web script is executed in a virtual machine may be specified by parameters in the user or system data. Each virtual machine may be executed using a "clean" version of an operating system, and therefore may provide protection to a user of an associated web script from viruses or other dangers associated with a compromised computing environment. In addition, each virtual machine may be provided virtual storage or a virtual database for execution of the web script further proving protection to sensitive data associated with the web script. The above described process may be automated using one or more web scripts.

The ASP may be accessed through a land-based line, using a modem for DSL, phone, or cable connections, through a traditional PC, or a wireless connection, such as through a mobile device or cellular telephone, using any suitable wireless technology that allows for secure transmission of data (e.g., WiFi). Transmission data is stored in the ASP's database (i.e., the storage allocated to the ASP in the cloud) such that a bill can be generated for the transaction by a web script. That bill can be processed automatically by the web script. The bill from the ASP can be based on a percentage of the sale price of a transaction carried out or can be a flat fee per transaction or per transmission. Alternatively, the user can pay a fee accordingly to a fixed, predetermined period, for example, annually, semiannually, quarterly, monthly, weekly; daily, or hourly that permits the user to have an unlimited or predetermined number of transactions during that billing period.

The ASP tracks the transmission of data (whether encrypted or unencrypted) and maintains a database with the status of each data transmission in the cloud. Thus, it can provide reports on data being entered, grouped, encrypted, validated, decrypted, transmitted, etc.

Existing users or new users may send or receive data, possibly in response to a communication generated by the ASP, such as an advertisement sent via email (e.g., a special offer by a merchant-user). Portions of the communication may be identical for all users of the system or customized based on a return users characteristics. Each user's characteristics are maintained in the system in a historical database containing a record for each user in the cloud. The historical database of user characteristics can also be used to validate data transmitted to and from that user.

The ASP may allow a user to specify or select a destination device that they would like to receive their data and/or view a user-interface. For example, a user may use a smart phone to initially establish a communication with the ASP through a form, but may desire to interact with the ASP through another device such as a television. Accordingly, the user may select an option on the form to view the form and/or data provided by the ASP on the television. The ASP may then format the form and/or data for viewing on the television, and push the form and/or data to the television as requested by the user.

The ASP may further interact with, or include, a voice server. The voice server may provide one or more interactive voice features to users of the ASP. For example, the ASP may use the voice server to read data from fields of a user-interface to a user through a telephone or other device. In addition, the voice server may convert voice data received by the ASP to text for processing by the ASP. The voice server may operate on a variety of languages, and may provide translation services to users of the ASP.

Referring now generally to how certain exemplary implementations are operated, the user enters information into a dynamically generated user-interface (i.e., web page or form) that is displayed. The customized user-interface enables a dynamic user-interface, such as a dynamic web page, to be generated for users by one or more web scripts. The format can be utilized by PCs, handheld computers/mobile devices, cell phones, smart phones, telephones, televisions, media players, videogame consoles, or any other type of computing device. The form may be a voice enabled form, and may include prompts that are read out loud to the user and enabled by the voice server. In one implementation, the information for each user-interface is stored within a mother web script which is an example of an agent or so-called zotbot.

The data is then validated by a web script to ensure that the form is completed correctly and the correct type of data is entered. Validation ensures that the data being transmitted is in accord with the one more rules for each data field maintained in a system database (e.g., the system checks for the proper number of digits of a credit card or phone number and checks that only numbers, not letters, have been entered). This helps to ensure security and filters out junk data and malicious snippets of code. The rules may be provided by a merchant or administrator associated with the service provided by the ASP. The data may also be validated using voice-recognition services provided by the voice server if applicable.

After the data is validated, it is encrypted using an algorithm by the web script, such as the Blowfish encryption algorithm or any other suitable, compatible encryption method, and transmitted to a recipient. The recipient may be specified by the merchant or administrator associated with the service, or may have been specified using a field of the user-interface by the user. To augment security, the encryption algorithm can be changed periodically or randomly. The data is then transmitted and decrypted so the recipient can process and store the data in a database. The transmission and encryption can be controlled by modules that use open source code or proprietary code.

Once the data is decrypted, the status of the data is generated and stored on the recipient's web server or other storage device by the web script allowing one or more users access to the status information. In addition, the ASP, through its own server or functionality provided by the cloud, may monitor the transmission of data and may store data being transmitted for backup and billing purposes. In particular, the ASP can use the stored data to determine the history of the data transmission, i.e., any malfunctions in how the system transmits the data, to correct the specific transmission and/or correct any system-wide or recurring problems in transmission. In some implementations, a mother web script may create and push a decrypt agent via a virtual machine to the user when called by phone (voice) or other device (data).

In addition, the stored data enables the ASP to bill users for the transmission of data, based on transactions consummated, or a combination of the two depending on the user's network activities. As described above, the system is capable of recording a trail of timestamps in each step of the process.

As one example of a suitable application, the ASP may be used by a medical professional. The medical professional may connect to the ASP and a mother web script may retrieve data associated with the medical professional (or an organization associated with the medical professional) and may use the retrieved data to generate a daughter web script for the medical professional based on the retrieved data. The daughter web script may be implemented in an instance of a virtual machine by the ASP. The daughter web script may provide a customized user-interface that allows the professional to enter patient (demographic, diagnosis, and treatment) information. The customized user-interface may be displayed on a desktop computer associated with the professional, a smart phone, tablet computer or any other device that may be used by the professional. The user-interface may also be voice enabled through the voice server. The daughter web script may dynamically detect and adjust the size and/or resolution of the user-interface based on the device used by the professional. The medical professional may connect to the ASP using voice recognition or through a biometric device. The ASP may then communicate with the voice professional by speaking one or more prompts to the medical professional. The information used/provided by the medical professional may be emailed, text messaged, or stored in the cloud.

The daughter web script may transmit the entered information to a hospital's and/or insurance company's database in an encrypted form. The data can then be decrypted by the recipient and validated for compliance with the requirements (customizable by the system) for data type and grouping or, for example, insurance company and other medical payor requirements for payment of claims. Meanwhile, the system tracks the transmission of data and maintains a database having the status of each event of the data transmission. Additionally, the system stores the data being transmitted for validation and backup purposes.

The method and system are configured to provide a secure means of transmitting sensitive patient data. The system can be adapted to be compliant with any legal requirements for submission of data, such as PCI compliance, HIPAA compliance, tax filing for the IRS, etc.

Referring more specifically to FIG. 1, an application service provider or other host 21 implemented by a cloud has extracted from a main database by any suitable means sufficient user information for a corresponding application. This user information has been loaded into a suitable, searchable or hierarchical database 23 for use by the system as described subsequently. The information in database 23 is preferably copied from or otherwise obtained from a client's or users main database, but an independently derived database 23 is likewise suitable. Alternately, in another suitable implementation, the data structure could be an XML, HTML, JavaScript, HTML5, or AJAX construct where it would always access a client's main database of associated information. In some implementations, the client information was provided by a client, or may have been entered manually by a user or administrator associated with the ASP. The storage associated with the database 23 may be provided by the cloud provider.

Suitable programming (i.e., one or more mother web scripts) represented by block 25 responds to user requests 27 and, through various agents or similar subroutines, accesses and arranges certain data from database 23 for further processing by the system. Programming 25 may be implemented using any suitable messaging and collaboration component or database management component for multi-user access to databases and corresponding manipulation of the data therein. Programming 25 preferably makes use of data templates 29, which templates are used by one or more additional web scripts or "agents" generated or spawned by the programming 25, along with data from database 23, to process the request or requests 27 being made of the ASP 21.

In some implementations, the programming 25 may spawn one or more daughter web scripts 33 or virtual web scripts 33 for processing according to the data templates 29 and data from the database 23. In addition, the data from the database and/or the data templates 29 may further specify whether one or more virtual machines are created to process the daughter or virtual web scripts 33.

The interactions orchestrated by the web scripts 33, agents or instruction sets of programming 25, templates 29, and associated data 23 are both generalized and optimized for any number of different types of requests 27 by means of a data structure 31. In some implementations, the data structure 31 is contained in the templates 29. More particularly, data structure 31 has been organized and is populated by programming 25 so that it can be used very efficiently in the generation of additional daughter web scripts or virtual web scripts 33. By carefully choosing, organizing, and orchestrating the population of data structure 31, a larger number of web scripts 33 (i.e., daughter or virtual web scripts) can be generated, corresponding to a larger number of requests 27, whether such requests are part of a single application of system 19 or across multiple applications of such system 19.

One example of a suitable data structure in Perl is set out below: TABLE-US-00001 $username="5004"; my %usernamecode=(5004=>"Smith,John", 5010=>"Kreiger,Maurice", 5012=>"Stein, Rebecca", 5111=>"Willard,Tim"); my $usernamereference=\%usernamecode; my $mattersreference={CLIENT101=>["108200 Davis v. Yoder", "207111 Beaver v. Tom", "001800 Smith v. Berger"], CLIENT102=>["207301 Son v. Tim", "107782 Springton v. McDermick"]};
TABLE-US-00002 print %q→popup_menu (-name=>"username", -values=>$username reference, -default=>$usermame); print $q→popup_menu(-name=>"reference", -values=>$mattersreference→{Sq→param("clientname")}, -default=>$mattersreference→ {Sq→param ("clientname")}→[0]);

Having manipulated data 23 in response to request 27, programming 25 generates web scripts 33 by suitable use of the templates 29 and the data structure 31. This can be done in batch mode at a specified time, on demand as needed (such as with voice recognition), event triggered, or at periodic intervals. The web scripts 33 may exist within the processing of the ASP 21, or may be spawned by the programming 25 and provided to the web server 35, as shown by step 35 of FIG. 1. In some implementations, the ASP web server 35 may be a virtual web server and may implemented by the cloud as described above, for example.

Depending on the nature of request 27, and the nature of the interaction of the ASP in such request, all or a portion of the web scripts 33 may be generated at step 35. Moreover, each web script 33, at a later time, may generate one or more additional web scripts 33 as the processing of the web script 33 continues, or based on user actions or input taken with respect to the web script 33. The web scripts may be called using voice recognition services provide by the voice server.

Programming 25 thus generates web scripts 33 which are adaptive in the sense that different system-level requests arrange data and corresponding instructions differently and dynamically, in response to such requests to generate adaptive instruction sets. These dynamic and adaptive web scripts or instruction sets which are generated are referred to as "hots" or "zotbots."

Figure 2:
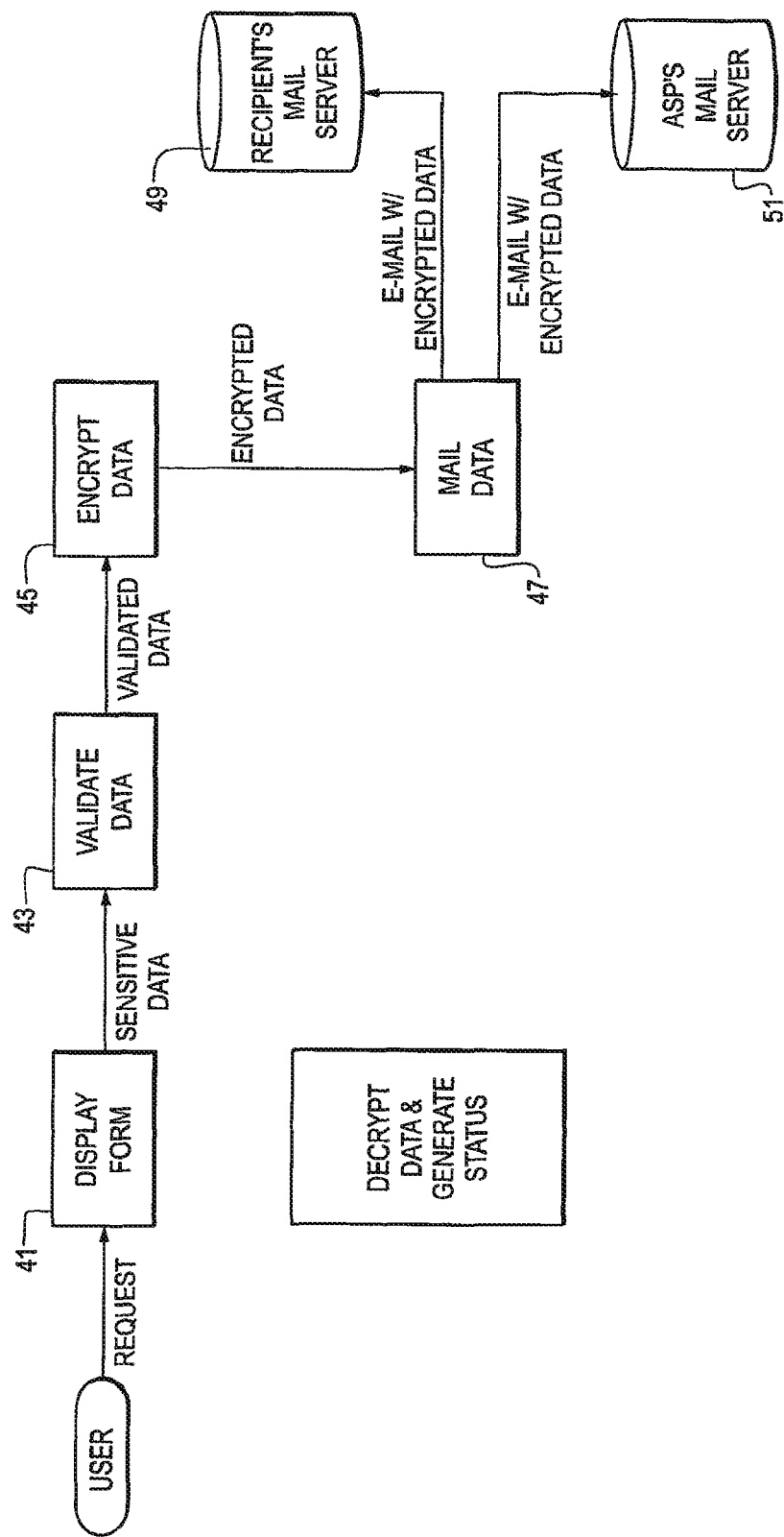

FIG. 2 further details the execution in function block 37 (FIG. 1) of the above-mentioned web scripts 33. Thus, in the case of a timekeeping program for attorneys, a patient diagnostic program for physicians, a food reallocation program for restaurant purveyors, or any of the other myriad user applications contemplated herein, execution of web scripts at step 37 involves further interactions and data transmissions between a user desiring to use system 19 and the associated data which populates not only the web scripts generated, but also the corresponding databases which may be used in response to user requests. Referring more particularly to FIG. 2, the execution of a web script in step 37, in one implementation, results in a user-interface displayed on a user-accessible device, preferably under SSL or some secure channel, such as a wireless handheld device or smart phone (step 41). The user-interface may be a form and may be generated based on data provided by the user, data from a template associated with the system 19, and also the type of user-accessible device used to display the form. For example, the form may be formatted at a resolution that is optimal for the particular user-accessible device that generated the request. The user-interface can be voice enabled and may be read to a user via voice prompts enabled by the voice server.

For those applications in which the user inputs data into such forms, the format or contents of such data undergo various encryption and/or manipulation steps depending on the protocols involved. Thereafter, depending on the application, data is suitably validated in step 43, encrypted (step 45), and emailed within SSL, sent encrypted via. SMS, sent directly unencrypted within a secure VPN tunnel, or sent unencrypted via secure SMS (step 47) to the desired recipient of such inputted data, be it a billing processor, patient record keeper, food purveyor, etc. for integration into a database, and the like. The data may be inputted by the user via voice recognition programs enabled by the voice server.

One aspect of the execution of web scripts which has thus far been described is its efficient handling of sensitive data. More particularly, encryption algorithms are chosen which are readily adaptable to a variety of different applications or sub-applications of the system 19. In one implementation, an open source architecture is the basis for encryption and decryption of sensitive data traveling on system 19 in response to requests or execution of web scripts. Of course, it will be appreciated that any number of security protocols may be used if needed in executing web scripts, including proprietary architectures.

The data inputted by a user is not only sent in encrypted form for further processing to its intended recipient (step 49), but is optionally sent to the host or ASP, as shown in step 51. The participation of the host or ASP in data handling, such as receiving inputted data by email, SMS, or other means, enhances the flexibility and functionality of the available applications for system 19. Thus, for example, the ASP can host multi-user interactive applications on a pay-as-you-go basis. Otherwise stated, the user of the application can be billed for use of system 19 based on the number of transactions it has engaged in, and such transactions can be "tracked" as they are received by the ASP in step 51 referenced above.

System 19 can thus be configured such that a heavy user of system 19 shoulders a correspondingly heavier financial burden and, conversely, an occasional user would be responsible for a correspondingly smaller burden associated with the conveniences and other benefits of using system 19. From the ASP point of view, programmers and application developers may expend time and effort developing or customizing system 19 to one user or a class of users and the cost of such development efforts can be returned to the ASP over time as a function of the use of such functionality by the user or users. This flexibility, in turn, makes pervasive e-commerce easier for ASPs and customers, as a cost structure associated with such pervasive e-commerce can be created and tracked by the ASP's server receiving data in step 51 of FIG. 2.

Figure 4:
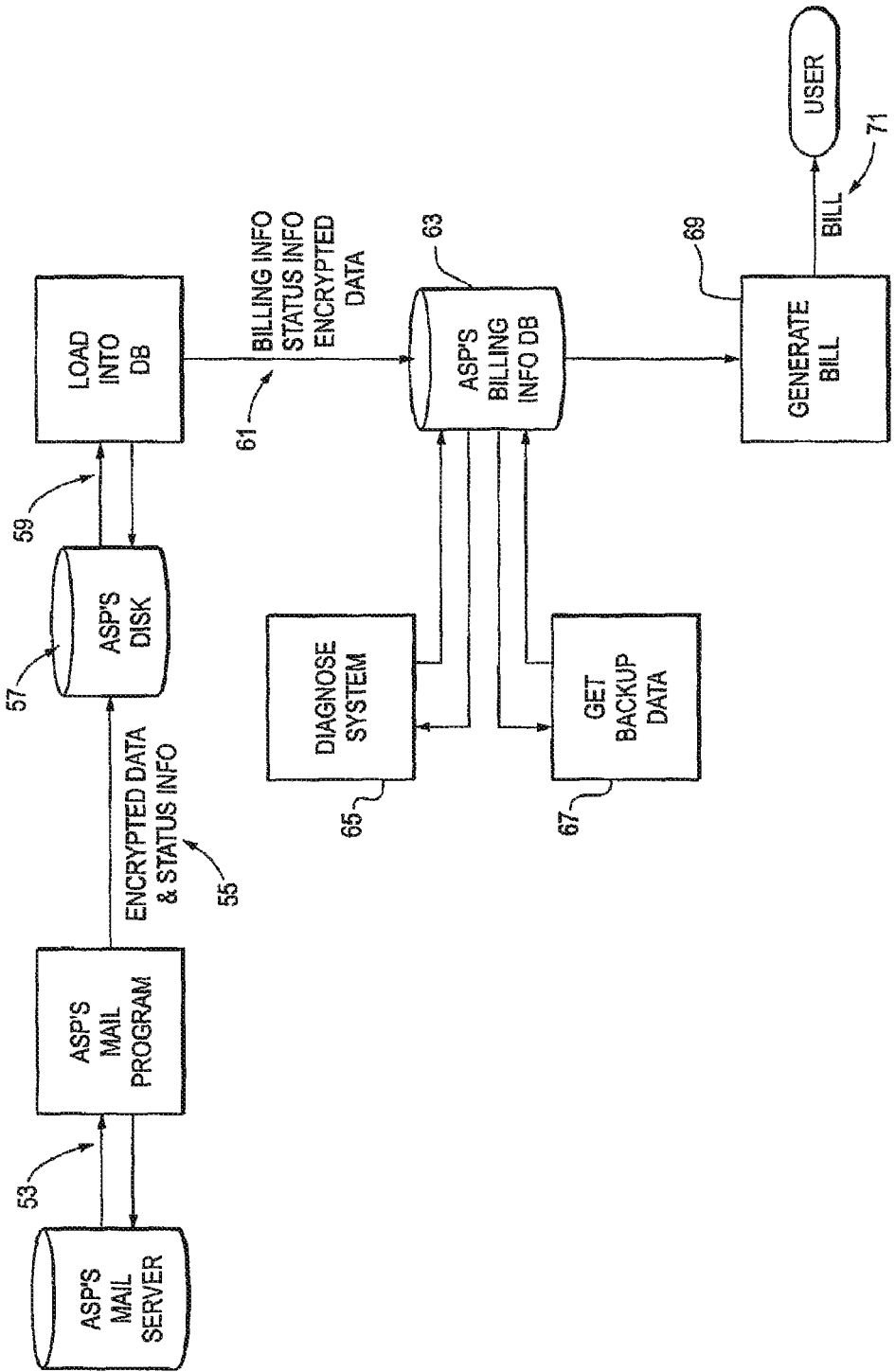

One suitable system and associated method for per transaction billing is shown in FIG. 4. Data received on the ASP's mail server or other receiving means in step 51 of FIG. 2 is manipulated by the ASP's messaging program in step 53 of FIG. 4, using suitable security measures, such as encrypting data, and such data from the messaging program is suitably stored on the ASP's disk 57. The disk 57 may be a portion of an amount of data storage allocated to the ASP by the cloud computing provider.

The data from disk 57 is suitably manipulated, filtered, or otherwise processed by steps 59 and 61 such that a billing information database 63 is generated. Database 63, in turn, is subject to diagnostics routines 65, backup routines 67, and bill generation routines 69 appropriate for the financial nature of the information contained in billing information database 63. Suitable programming includes whatever formulae, algorithms, or methodologies used by the ASP to ascribe a financial value to the use of its system, so that a corresponding bill can be generated in step 71, and communicated suitably to the user of such system 19. In one implementation, the ASP's messaging and collaboration system uses an agent or web script to automatically store the encrypted data and status information to disk and load the billing, status, and encrypted data to the ASP's billing information database, with the appropriate billing flags checked. The ASP can then bill on a regular (monthly) basis.

Figure 3:
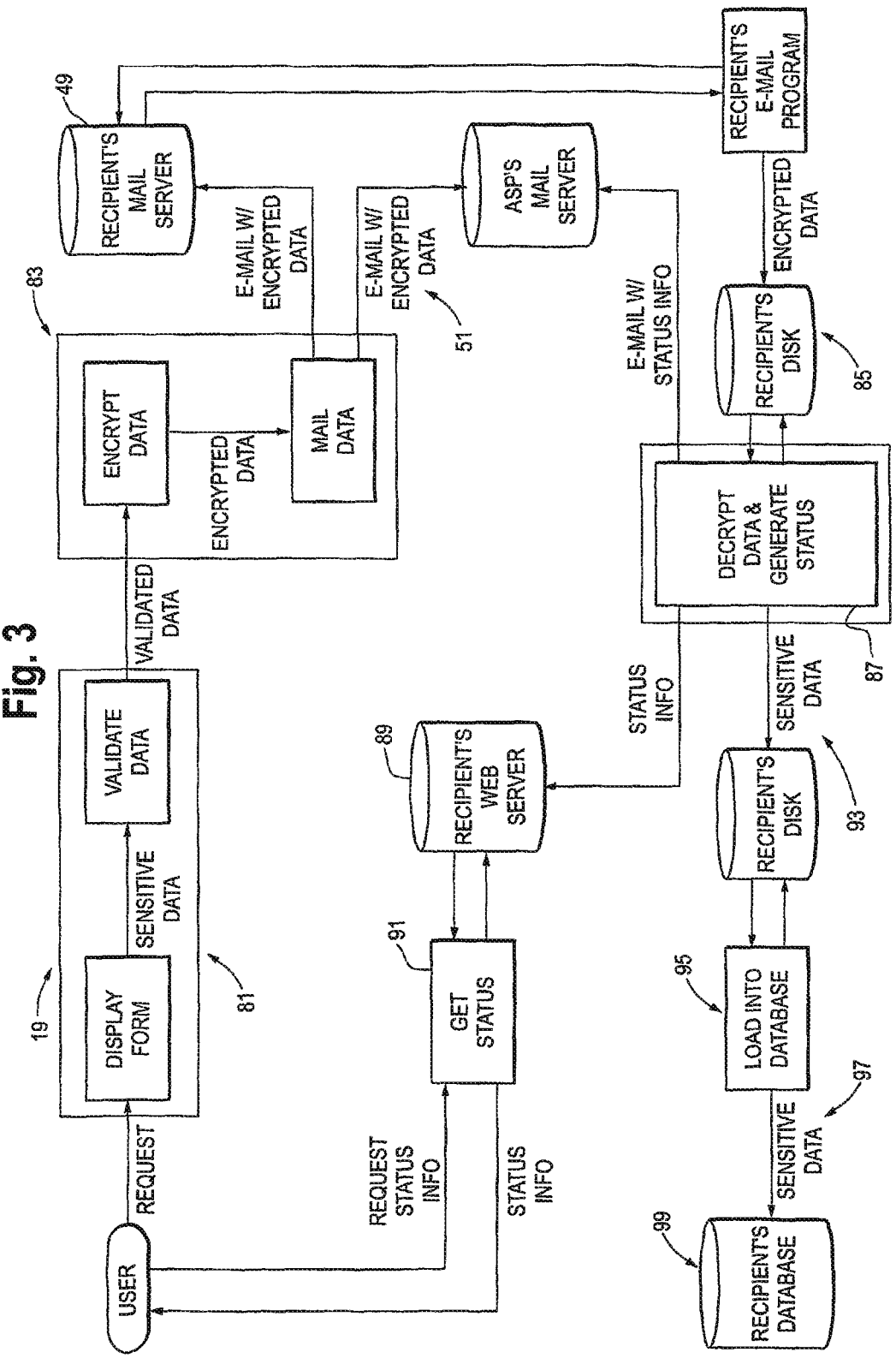

Referring now to FIG. 3, it is appreciated that system 19 is preferably a form of "middleware" meaning it creates an interactive fabric or wrapper for processing data which is accessed or inputted from a distributed location or locations. Although such data processing ultimately may interact with central databases, the use of such middleware, fabric, or wrapper reduces the need to access central or other main databases during data processing and thus improves efficiency, speed, system performance, and produces all the other advantages related to simpler communications.

By using the middleware of system 19, the agents "bots" or web scripts discussed previously are created so as to contain or have access to all pertinent information without needing access to a main database. For example, each web script may execute in its own virtual machine. Such architecture limits data corruption, avoids data collisions, deadlocks, the need for syncing over wireless or by cable, enhancing performance and security. The middleware likewise is designed to coexist with a system's current processes. Preferably, the system 19 is accomplished in a cloud based architecture and in such a way that functionality may be added to the system without needing customization to existing applications of the system. As seen in FIG. 3, most of the information processing discussed previously occurs in the layer separate from the main processing systems and databases associated with application information. Thus, execution of web scripts discussed in reference to FIG. 2 may occur in a module 81 which may be preferably executed by the cloud in a virtual machine which is separate and distinct from main database 99.

Communication of the inputted data from module 81 is accomplished by suitable messaging applications, such as electronic mail communications in system module 83, which module 83 sends electronic mail containing the validated data both to recipient mail server and to ASP mail server, as described previously with request to steps 49 and 51 of FIG. 2. The middleware modules are structured so that, if desired, data inputted therein by the user is checked for integrity, conformance, validity, etc. before loading on or transmission to the main database of the client's system. In some implementations, each middleware module may be executed in its own virtual machine.

Once encrypted data has been suitably received by the intended recipient, it is independently processed from recipient's disk 85, that is, independently of the "wrapper" which otherwise executes web scripts and otherwise processes data in response to user requests. The recipient decrypts the data and generates suitable status indicators in step 87. When executing programming referred to as Agent Decrypt, the programming decrypts the information, which is displayed on the web browser's screen or other user device, and creates a status information file (step 87) on the web server, preferably on the cloud based environment where Agent Decrypt resides. This status file is preferably updated with current status information as appropriate agents execute corresponding tasks within the middleware layer or as the system otherwise dictates. Thus, in a food purveyor application, for example, the customer places an order. The order information is processed at the middleware layer by modules 81 and 83. The ASP may spawn suitable web scripts that decrypt the order information, trigger the creation of an order status file (step 87), and send email confirmation to the requestor or customer (step 89). The order information is validated for its integrity and any payment processing is likewise accomplished by suitable web scripts and loaded into the database. The status is periodically updated at various points during the processing of the food order by means of agents or web scripts, and means are provided, through web links or otherwise, for the customer to obtain reasonably current status information (step 97). The mother web script may push or spawn the Agent. Decrypt on demand as a daughter web script via virtual machine to a user.

Depending on the particular application or user request, the data is processed such that the status information file is generated on the cloud based environment where the agent resides (in step 89), where it is either communicated or accessed by user interactively in status or other requests 91. The decrypted data is saved as a file onto the recipient's disk 85 (or virtual disk on a virtual machine) and is likewise suitably transferred and loaded onto the main database as shown in step 93, 95, and 97.

Throughout the operation of system 19, secure messaging and related encryption and decryption protocols are used, as required by the particular application.

It will be appreciated that the programming 25 for generating web scripts may be accomplished in any suitable language. For example, programming 25 map be accomplished in Perl and the execution of such Perl scripts generates corresponding HTML code. Data security is likewise provided by any suitable means, including SSL and VPN. Although Perl or other web script programming may be used, still other programming languages and protocols are likewise suitable, such as Java, HTML, HTML5, AJAX, C++, XML, C#, and the like.

The following examples further illustrate aspects of the systems and methods described herein.

Example 1

In one exemplary implementation, the network/ASP is used in connection with the health care field. Specifically, a physician examining a patient uses a tablet or other portable, wireless computing device to enter information about a patient being examined and/or treated. The physician's portal into the network provides a customized user-interface with fields for receiving information on the patient, such as demographic information, medical history, medications being taken, allergies, summary of the diagnosis made by the physician, treatment resulting from the diagnosis, etc.

In real time, the physician can transmit the data to the hospital or practice office database by encrypting the data and transmitting the encrypted data. A web script may receive and decrypt the data and may validate the data against its own database. The web script may execute in a virtual machine to provide additional security. The hospital or practice database contains information on the patient, diagnosis, treatment, and any other pertinent information on the patient or medical treatment. The data entered by the physician can be validated to make sure it is consistent with the data maintained in the hospital or practice database. Alternatively or additionally, the data can be validated upon entry by the physician.

Another web script may monitor the data transmission and validation and can notify the physician in real time if the data being entered is inappropriate (or appears to be an error), by invoking a cognitive computing web service API, embedded within a set of instructions, encapsulated in a virtual machine to query the data submitted. In addition, the web script allows for the transmission of a similar message from the hospital or practice database to the physician if one of their databases generates information that the treating physician should have, e.g., insurance no longer valid. Meanwhile, the web script stores all of the data transmitted and monitors the status of the transmission. The web script can provide status reports to users regarding the data being transmitted and the transmission process. In addition, the web script bills the user(s) based on the predetermined cost scheme for use of the network.

In some implementations, the same or different web script may allow the physician to selectively display information to the patient on one or more computing devices, televisions, or other devices. For example, the physician may use their tablet or wireless device to cause the web script to display information related to the patients' health on a television in the examining room. The information may include x-rays of the patient or information related to a diagnosis. Alternatively or additionally, the physician may cause the information to be displayed on, or sent to, a smart phone or cell phone associated with the patient. In some implementations, the information may be displayed in response to one or more triggers such as a voice command from the doctor, RFID tags or devices that transmit information within range of receivers on the television or other devices, or biometric tags/devices associated with the television or the physician.

The ASP application described above can be used to support other members of the health care field as well. For example, psychiatrists can use it to gather patient information during a therapy session. Also, physical therapists can use the network to chart the rehabilitation progress of patients and compare to previous sessions.

Example 2

In another exemplary implementation, the network/ASP is used in connection with the food service industry. Specifically, a restaurant (or food delivery and/or take out store) maintains a portal in the network containing its daily menu and an ordering form with prices. A user of the network can access the restaurant's portal or web site and place an order by entering and transmitting the data (optionally, encrypting the data, such as if credit card information is provided). The restaurant's form may have line items to choose from in a list, replicating a conventional restaurant menu, or popup menus. The form has the items that the restaurant offers during a specific period (e.g., daily or weekly specials). These line items or popup menus can be changed, for example, if a restaurant changes its menu or runs out of a particular item.

Another example of a data field for the restaurant's form is the site for pickup of food. The options can be from a list (or popup menu) of available pickup locations. The user would generally pick the most convenient location; however, if a location reaches capacity, the location can be removed from the list so that it is no longer available for choosing.

The recipient-restaurant validates the order data (ensuring that, for example, the customer name contains only letters) and processes the order or, if the data in the order is inappropriate, notifies the user in real time by transmitting a message through the network. Possibly, the restaurant encrypts and transmits data regarding the final price, the time the food will be ready, etc. back to the user by the same process.

During the order process, the network receives and stores the transmitted data for backup and verification purposes. This enables the network to bill the users for the transmission of data or based on the transaction consummated and serves as a backup copy for the data being transmitted.

Web scripts can process the messages, validate users, decrypt, validate data, and load into the database. Web scripts can also process bills. Web scripts may further read out loud data using functionality provided by the voice server.

Example 3

In yet another exemplary implementation, the ASP may be used in connection with a law firm billing system. A web script of the ASP creates a customized portal for each user having fields containing popup menus displaying permissible options for each field. Alternatively, the fields may be read out loud to the users via a voice recognition system enabled by the voice server. The fields may be user identification, work type, time spent on a task, task description, client and matter names and numbers, billing rate, etc. The fields may be specified for the law form by a template or data stored by the ASP and associated with the law firm.

An attorney can enter time spent on matters and descriptions of those matters from a tablet computer, smart phone, or other remote and/or wireless source. This can be entered at the time of performing the work to be transmitted to, possibly wirelessly, the law firm's central billing program that generates bills for clients. The data from a user is encrypted (of special importance for legal services rendered based on the need for client confidentiality, i.e., the attorney-client privilege), decrypted at the law firm's central location, and validated. The application may be implemented by a web script and may be executed by an instance of a virtual machine.

Figure 5:
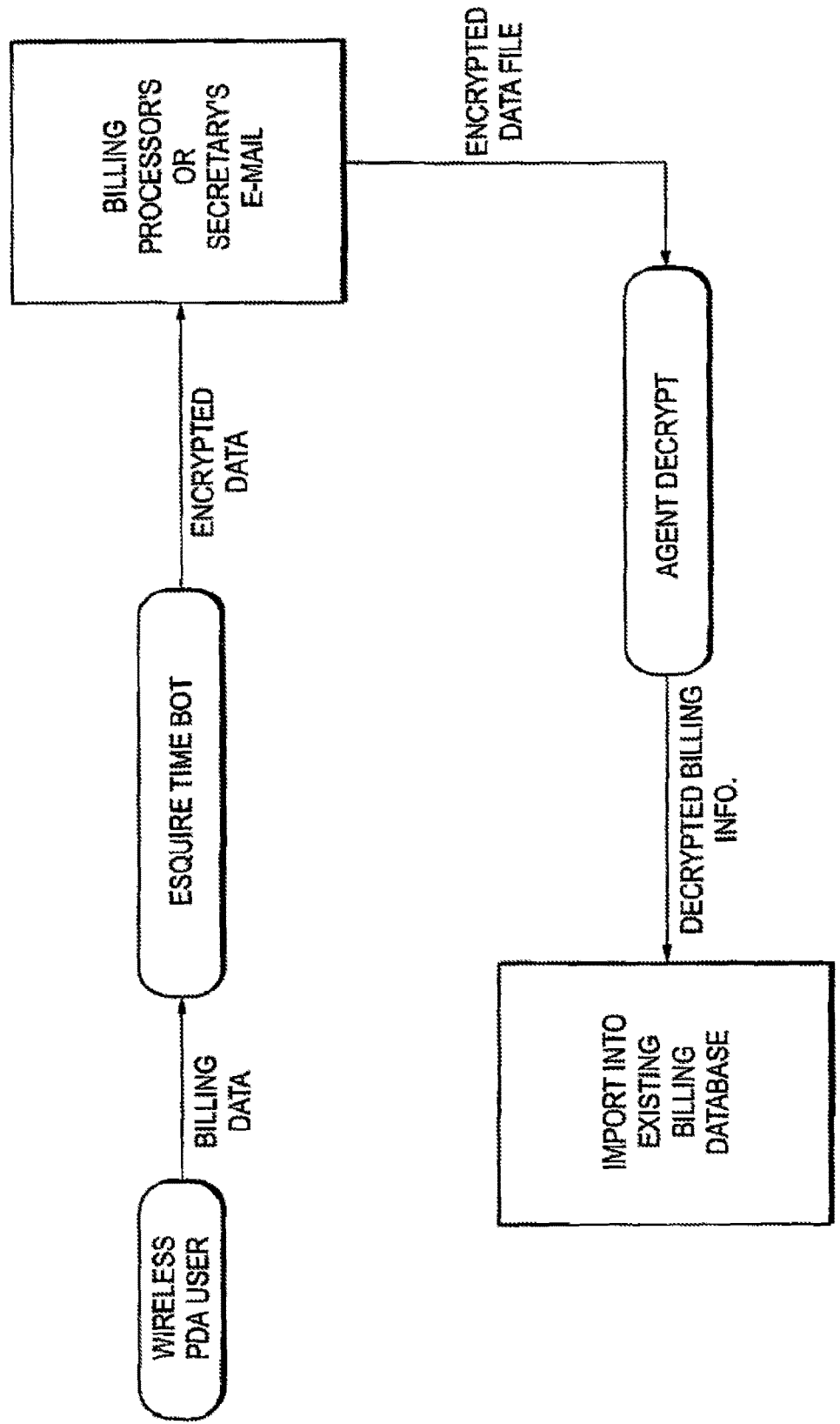

As shown in FIG. 5, with regard to the EsquireTimeBot® application, legal billing data (e.g., client, matter, description, time spent, etc.) is entered by a user through a mobile device, smart phone, or tablet computer. Alternatively, the user may enter the data by reading the data out loud through a voice portal or other functionality provided by the voice server. This data is transmitted through the EsquireTimeBot (web script) that encrypts and, optionally, validates the data. Each instance of the EsquireTimeBot may be implemented on a separate virtual machine by the ASP. The data is then transmitted to the billing processor for the law firm or secretary of the user, possibly through email. The data is then decrypted by the AgentDecrypt (web script) and optionally, validated. The decrypted data is then transmitted to the billing database for importation and further processing (e.g., generating bills). In an alternative implementation, the billing data can proceed from the user to the billing database (without being transmitted to the billing processor or user's secretary) via other web scripts. The bills may further be delivered or viewed by a user through a virtual desktop with a stack of virtual bills awaiting review. The bills may further be emailed directly to the client.

In addition to use with a billing program, the ASP can also be used by attorneys engaging new clients. It allows for a user to enter a prospective client name remotely via a mobile device or smart phone and that client name can be transmitted to the law firm's database in real time. Using a cognitive computing web service API encapsulated in a set of instructions on a virtual machine coupled with a web script encapsulated in a virtual machine, the prospective new client name can be compared to existing clients, former clients, or adverse parties to matters the firm is handling to determine if the firm can represent that prospective new client or if there would be a conflict of interest.

Figure 6:
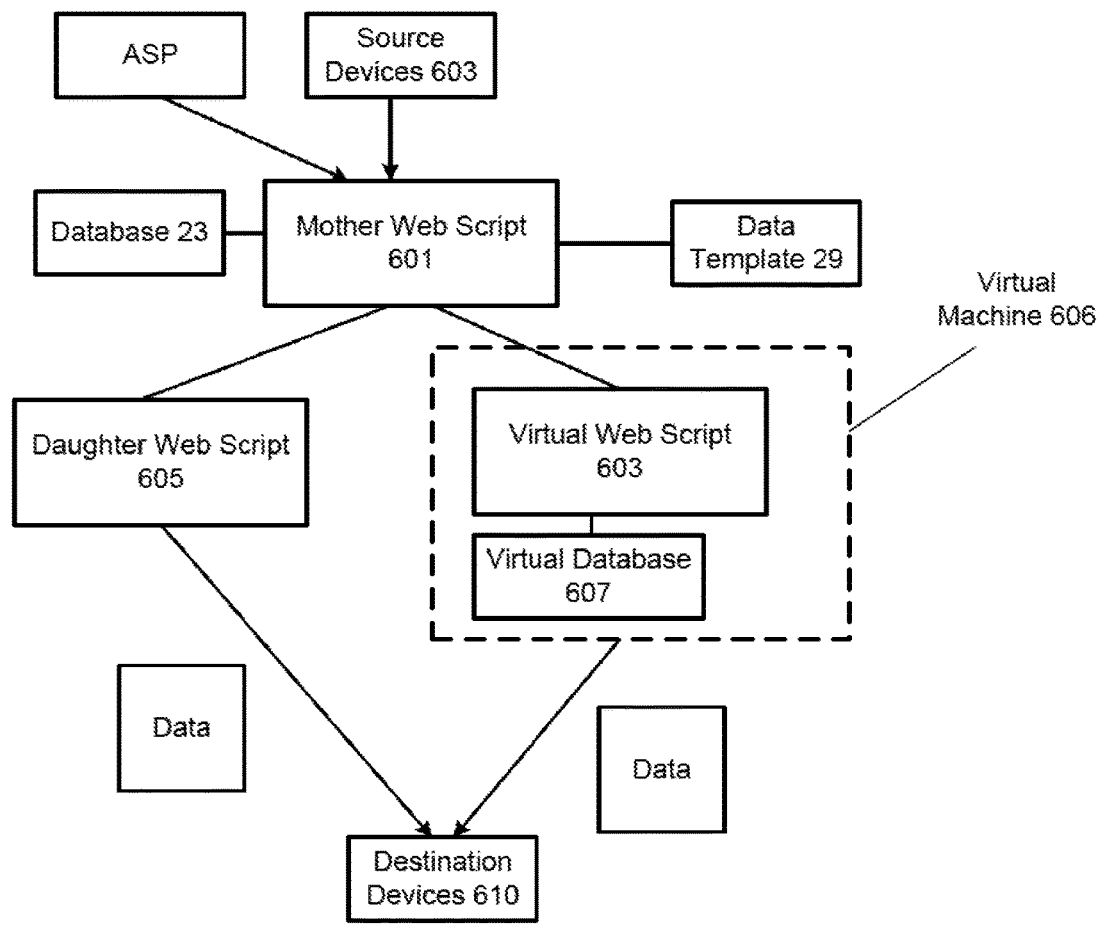

As shown in FIG. 6 is an illustration of another implementation of the system described herein. The system includes a mother web script 601. The mother web script 601 may be associated with the messaging and collaboration component and may be implemented by, or may be part of, the processing 25 described previously with respect to FIG. 1. The mother web script 601 may directly or indirectly provide all of the services and functionalities offered by ASP. While only one mother web script 601 is shown, it is for illustrative purposes only; there is no limit to the number of mother web scripts 601 that may be supported. The mother web script 601 and the various components described in FIG. 6 may be implemented using a cloud based computing system.

The mother web script may receive a user-initiated request from a source device 603. The request may be a request to receive access to one or more application services provided by the ASP. The source device 603 may one of a variety of source devices including, but not limited to, a personal computer, a laptop, a smart phone, an e-reader, a media device such as a television or video game console, a cell phone, or a conventional telephone. The user-initiated request may further be received in a variety of formats including an HTTP request, an SMS message, an email message, and a dual tone multi frequency signal, for example.

In some implementations, the request may be an internal request and may be received from the ASP. For example, the request may be a request for the mother web script 601 to perform a monthly bill generation process for a law firm.

The mother web script 601, upon receiving the request may generate, spawn, or invoke one or more daughter web scripts 605. The mother web script 601 may generate, spawn, or invoke the daughter web scripts 605 according to data associated with the request, data from the database 23, or from the data template 29.

The daughter web script 605 may be a specialized web script that performs the particular processing or application services requested by the received request. The daughter web script 605 may similarly use/access data associated with the request, data from the database 23, or from the data template 29 when processing the request. In some implementations, the daughter web script 605 may be spawned or created by the mother web script 601 when the request is received and may be destroyed or closed when it finishes processing. In other implementations, the daughter web script 605 may persist in the cloud based computing system, and may be generally made available to users or applications for processing requests.

The mother web script 601 may further generate, spawn, or invoke one or more virtual web scripts 603. A virtual web script 603 may be similar to the daughter web script 605 described above, except the virtual web script 603 may be executed in the virtual machine 606. The mother web script 601 may generate the virtual machine 606 when the virtual web script is generated. In addition, the mother web script 601 may allocate the virtual web script 603 access to a virtual database 607. The virtual database 607 may be a portion of the database 23, or some other database or storage device, that only the virtual web script 603 can access. In some implementations, the mother web script 601 may copy any data used by the virtual web script 603 from the database 23 or data template 29 to the virtual database 607 when the virtual database 607 is created.

The virtual machine 606 may allow the virtual web script 603 to be executed in an operating system environment that is completely separate from an environment used to execute any other scripts. Moreover, because the virtual machine 606, including operating system and virtual database 607, is created at the time that the virtual web script 603 is created, it can be reasonably assured to free from viruses, spyware, adware, or any other malware that may be associated with preexisting systems.

While not illustrated, in some implementations, one or more daughter web scripts 605 may further be executed in a virtual machine 606. In addition, one or more mother web scripts 601 may also be executed in a virtual machine 606. By executing the daughter web scripts 605 and/or mother web scripts 605 in the virtual machine 606, the web scripts may receive the security advantages associated with virtual machines.

Each daughter web script 605, and virtual web script 603, may further spawn, invoke, or create additional daughter web scripts 605 or virtual web scripts 603. With respect to the virtual web scripts 603, each additionally generated virtual web script 603 may also receive unique virtual memory and be executed in a unique virtual machine 606.

The daughter web scripts 605, and virtual web scripts 603, may generate and provide data to one or more destination devices 610. The destination devices 610 may include a variety of devices including, but not limited to, a personal computer, a laptop, a smart phone, an e-reader, a media device such as a television or video game console, a cell phone, or conventional telephone. The data may further be provided in a variety of formats including an HTTP request, an SMS message, an email message, a media file, a blinking light, and a dual tone multi frequency signal, for example.

The daughter web scripts 605, and virtual web scripts 603, may provide the data to the destination devices 610 in a user-interface, such as a dynamic web page, voice recognition enabled prompts, RFID interface, or biometric interface. Other types of user-interfaces may be supported and may depend on the format or protocol of the destination device 610. For example, where the data is SMS data the user-interface may simply be the user-interface used by the SMS messaging application of the destination device 610. Where the data is to be read to a user through a telephone, the user-interface may be an automated voice system that reads the data to the user. Where the destination device 610 is the same as the source device 603 that provided the initial request, the data may be provided in the same user-interface through which the user initiated the user-initiated request.

Where the destination device 610 is not the same at the source device 603, the daughter web script 605 and/or virtual web script 603 may determine a type or characteristic of the destination device 610 and may generate the user-interface based on the determined type or characteristic. The characteristics may include resolution and screen size, for example. The determination may be made from information provided in the user-initiated request or from the database 23 and/or data template 29.

In some implementations, the source device 603 used to initiate the user-initiated request may be different than the destination device 610 that receives the data. For example, the system 19 may be implementing a media related application where users can use a source device 603 such as a smart phone to select media to view on a destination device 610 such as a television. The daughter web script 605 may receive a user-initiated request that identifies a media file and a destination device 610. The daughter web script 605 may retrieve the identified media file, format the media file into a format that is suitable for the destination device 610 (if necessary), and may provide the media file to the destination device 610 using a protocol supported by the destination device 610.

In some implementations, in addition to providing data to one or more destination devices 610, the virtual web script 603 (or daughter and mother web scrip(s) may provide a user access to the virtual machine 606. Through the virtual machine 606, the user of the destination device 610 may use and interact with the virtual machine 606 as if the computing environment provided by the virtual machine 606 was part of their device 610. For example, an employee of a company may use a destination device 610 to interact with a virtual machine 606 that is modeled after a computing environment that the user uses when at work. This feature is commonly known as a virtual or remote desktop. Media files, i.e., movies, on the virtual machine 606 can be pushed to a television or other media device selected by a user.

The web scripts (i.e., mother web script 601, virtual web script 603, and daughter web script 605) may be triggered or invoked by the ASP or one of the source devices 603. In addition to the source devices 603 described above, the source device 603 may include biometric devices and tags, RFID devices and tags, and smart devices and tags.

Figure 7:
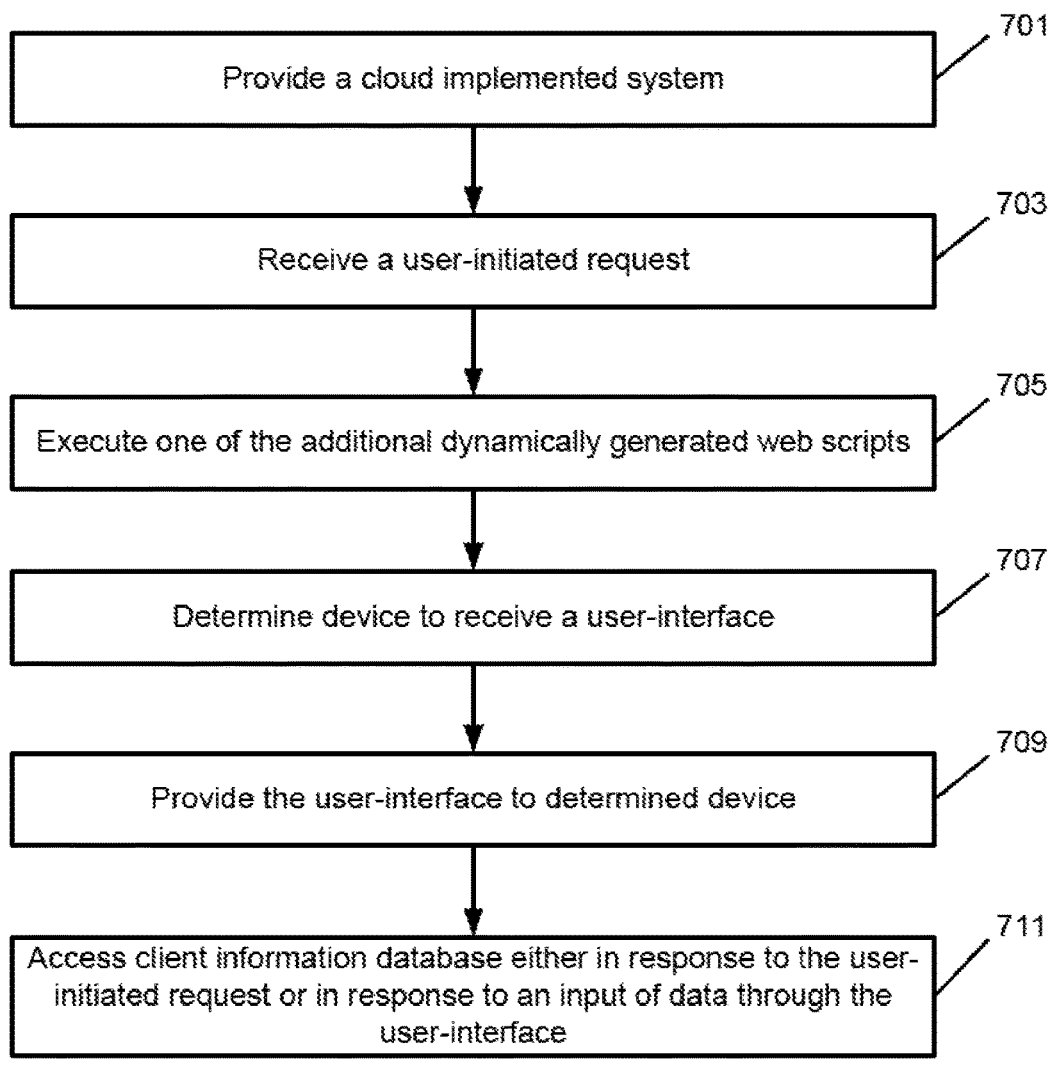

FIG. 7 is an illustration of a method 700 for providing an ASP service. The method 700 may be implemented by a cloud based computing system.

A cloud based computing system is provided at 701. The system may be provided as part of an ASP and may be provided in conjunction with an existing client database. The system may include a user information database derived from the client database, a messaging and collaboration component operatively associated with the user information database, and at least one template configured to be populated by the messaging and collaboration component. The system may further include at least one mother web script operatively associated with the messaging and collaboration component for dynamically generating additional executable web scripts independently of the existing client database and from access to the template and the user information database in response to a user request.

A user-initiated request is received at 703. The user-initiated request may be received by the mother web script and may be a user-initiated request for information to be processed by an application provided by the ASP. The request may be received by one of a variety of source devices including, but not limited to, a telephone, a smart phone, a cellular phone, a mobile device, a web browser, a personal computer, and a television. The request may be a variety of requests including an SMS message, a packet, an email, e-reader, biometric device, RFID, or a telephone call.

One of the additional dynamically generated web scripts is executed at 705. The one of the dynamically generated additional web scripts may have been generated in response to the request based on executable code from at least one data structure included in the template. The dynamically generated additional web script may be a daughter web script. In some implementations, the additional web script may be a virtual web script and may be executed by the cloud based system in an instance of a virtual machine that is spawned by the mother web script.

A device to receive a user-interface is determined at 707. The device may be determined by the additional web script based on one or more of the user-initiated request, the user information database, and the template. The device may be one or more of a television, a smart, phone, a media player, or a personal computer, for example. The device may be different or the same as the device that initiated the user-initiated request. The user-interface may be used by the user to interact with the application provided by the ASP, and may be implemented as a dynamic web page, for example.

The user-interface is provided to the determined device at 709. The user-interface may be provided by the one of the dynamically generated additional web scripts in response to the user-initiated request.

Client information database is accessed either in response to the user-initiated request or in response to an input of data through the user-interface at 711. The client information database may be accessed as part of the execution of the application provided by the ASP.

In view of the foregoing description, it will be appreciated that one aspect or advantage of the systems and methods described herein comprises a high tech and cost efficient model for conducting business via a computer network, such as through the Internet. As a further advantage, the method and system implement pervasive computing and do not need to be limited geographically or technologically in their reach; suppliers and users can be geographically spread out, use different internal computing systems, and still be linked up by the system. In addition, the systems and methods described herein can provide advertising to the users of the network who provide goods or services or exchange data. The advertising may be provided automatically in the appropriate language or demographic.

As an example of pervasive ecommerce, a user may place an order to the ASP in Chinese via voice, text, or some other format. The ASP may translate the order to English, process the order, and provide any confirmation data to the user in Chinese. The confirmation may be provided as a phone call, text message, email message, virtual desktop, blinking light on a smart phone or other device, or a voice message.

As a still further advantage, the systems and methods described herein provide an efficient, time saving network for engaging in commerce (e.g., purchasing goods and/or services) or otherwise exchanging data between users in real time. The systems and methods described herein act as a universal data interface that can connect different types of systems, such as a data input method into an existing legacy system.

In a related advantage, the method and system allow for the incorporation of modern, developing wireless technologies into legacy systems; in this way, a mobile device, smart phone, tablet, or other computing device can be used to populate a legacy database.

Yet another advantage of the systems and methods described herein may be based on proven Web technologies and open source architecture.

In certain aspects, the systems and methods described herein eliminate the mundane, costly, and error prone task of manual data entry from handwritten or typed forms, reentry of data, validation, and proofreading, and the inherent errors that go with these processes.

The systems and methods described herein advantageously allow for secure, customized, and efficient grouping and real time transmission of data across a computer network in a more efficient manner than previously used. The customization provided by the network enables it to be used by numerous industries and for countless tasks and transactions.

As a still further advantage, the systems and methods described herein provide businesses with the opportunity to embrace wireless mobile devices and other new forms of technology, enhancing their hardware infrastructure, at a low cost to integrate and update the technology. Furthermore, it allows workers away from the office to connect to their business systems securely and in real time to exchange information using pervasive devices.

As still another advantage of the systems and methods described herein is a time saving and pain killing method of data entry into a database or legacy system. It solves the problem of recording data due to its ease of use, facile implementation, and low cost of integration. It saves users time by allowing them to record data in real time due to its convenient, intuitive user-interface and pervasive computing feature. It allows efficiency in businesses by reducing the need to send, receive, and reenter data transactions manually. Data need only be entered once, as opposed to a multitude of times (as with certain conventional data exchange systems), saving businesses time and money.

Furthermore, users do not have to be at an office PC wired to a network to input data according to the method and systems described herein. Users can input data remotely from their offices/homes or in transit, such as in the field or at customer locations, in real time while activities on which they report are happening. The users can be provided with a virtual desktop environment that mimics the computing environment that the users are accustom to in the office, but that can be used through the user's home computer, smart phone, or other computing device. The remote accessibility minimizes the amount of lost information, e.g., from transcribing handwritten notes or attempting to remember events and information to input. The method and system are simple and intuitive such that users do not have to overcome a huge learning curve for integration of the method and system. Also, the method and system can be customized for the target user to further simplify and reduce barriers to learning and successful operation.

The universal connectability of the systems and methods described herein is capable of linking applications internally within a company, allowing integration of key internal systems. It allows users to keep their existing legacy systems, preserving their large capital investments, and at the same time, providing them with a cost effective opportunity to embrace new technologies, such as pervasive computing or possibly XML, AJAX, or HTML5, without losing compatibility with legacy systems. Companies can enhance their existing systems with customized applications and different spoken or written languages at a low integration cost.

Using the cloud provides users with a continual upgrade path of hardware infrastructure as the hardware infrastructure used in hosting the software is upgraded and maintained by the cloud provider. The pervasive computing environment of the systems and methods described herein has robust functionality because the scripts may be server-based; they do not need to reside on the handheld device. Accordingly, the system is not constrained by the handheld's limitations, such as a small memory size, slower processor, etc.

The ASP enables users to have customized user-interfaces and applications, e.g., pages or portals. A web script, such as an email agent or zotbot, can create the customized user-interface or applications automatically for the system. For example, each portal may provide a user-interface having fields for entering data. Each data field may have a popup menu that provides options for a user to select. The popup menu may supply a default selection for a field to ensure that there is data in that field. The popup menu selections can be changed periodically, such as on a weekly basis, by use of a zotbot. The zotbot prompts the user for the desired selections for each field or for initialization information. It then generates the appropriate web script (Mod Perl or any other suitable programming language being used) that creates the desired user-interface. These scripts are small, simple to manipulate, and portable across a multitude of computing platforms.

The systems and methods described herein can also be used between businesses as a business-to-business interchange. Businesses can exchange data regardless of whether the two businesses use different computing systems and have different database programs. For instance, the system may be used as a supply chain management application. That is a supplier may transmit information to a customer directly through the system. The information transmitted can be encrypted and validated, as described above, and the customer can incorporate that information directly into its database. In addition, it is capable of connecting disparate proprietary systems even from different companies, acting as a bridge for data exchange. It allows businesses to build closer ties to their suppliers, distributors, and customers.

Email agents, web scripts, or hots can process the messages in a group and: validate the user, decrypt the message, validate the data, and load into the database. The system is flexible such that email clients and encryption algorithms can be chosen from open source architecture, proprietary architecture, and combinations of these architectures.

The method and systems described herein also provide a means by which information can be timestamped in order to verify the date on which information is generated or transmitted. The system is capable of recording a trail of timestamps in each step. The system's servers generate the times used for the timestamps. Additionally, the time of data transmission can be recorded for different users of the system, providing further corroboration of the timestamps.

The timestamping ability is especially useful for laboratories or inventors who want to record the earliest date of experimental results and/or an invention; thus, not only can sensitive data be securely entered and transmitted, it can also be timestamped. Timestamping according to the systems and methods described herein is also useful for electronic documents and/or web site pages whose publication dates cannot be verified with the same ease that a newspaper or magazine article (or other document first published in paper) can.

FIGS. 8-11 describe various embodiments of the invention involving mother scripts, virtual atoms (virtual machines containing daughter or virtual scripts), virtual molecules (a collection of virtual atoms) and devices used in the Internet of Things (IoT). A virtual atom or atomic zotbot may be configured for use with the methods and systems described herein. For example in one embodiment, a virtual atom may be considered a microscopic virtual machine, containing at least an operating system and a mother script, residing on a microcontroller, sensor, USB flash drive, chip, module, server, or other similar device that may be associated with the Internet of Things (IoT). It should be noted that a "request" refers to the request for data from any system, device, person, or processor and/or a request to transmit data to any system, device, person, or processor.

In one embodiment, the mother script may be the nucleus of the virtual atom and may dynamically generate, spawn, or invoke, one or more daughter scripts based in part on data collected by the mother script, data stored in a system database, or data stored in a user's database. The mother script may include one or more adaptable instruction sets. In an embodiment, the data may be captured and encapsulated in one or more virtual machines of varying operating systems or languages in a cloud based environment that reside on physical servers across the globe.

The virtual atom may be activated by data or virtual electrons and may be data driven by a request for data from one or more devices, systems, or end-users. The mother script dynamically generates daughter, virtual, decrypt, and receptor scripts to securely receive/capture data from devices, such as an IoT device or securely send/transmit data to an IoT device.

In some embodiments, a mother script may dynamically generate, spawn, or invoke several daughter and virtual scripts encapsulated in virtual machines or other virtual computing environments, at once or in parallel, to create virtual atoms. In one embodiment, a virtual atom may be assigned at least one task, and may connect to other virtual atoms via secure shell (SSH) or similar protocol. In some embodiments, a virtual atom may share data or virtual electrons, or virtually bond to create a virtual molecule or molecular zotbot. The virtual molecule allows the virtual atoms to share data, process resources, and adaptable instruction sets to execute complex tasks from a request dynamically in a virtual computing environment. In one embodiment, the data may be changed or altered as it is communicated between virtual atoms or machines based on the request. For example, additional data representative of new information may be added as the data passes from one atom to the next.

To capture a big piece of data, the virtual atoms may form repeatable functional groups and chain them together, like a protein or DNA chain, to form a chain of miniature or standalone computer systems that may intercommunicate, break apart the big data into smaller pieces, and capture them sequentially across the repeatable chain of virtual atoms. The functional groups behave like virtual computer program modules. The virtual molecule may behave like a complex computer program. The virtual atom may behave like a function in a computer program, API, or similar system. The virtual molecule may spawn itself or replicate itself dynamically, with the same configuration or with a slightly altered configuration, based on the request it receives driven by data. For example, the virtual molecule may spawn itself with tighter security configurations based on a request driven from data indicating to do so.

In some embodiments, virtual molecules may combine/bond with other virtual molecules and virtual atoms to form even more complex computer program activities or processes from a request. Virtual molecules may generate, spawn, and invoke other virtual molecules and virtual atoms from a request.

An IoT mother script is a script within its own virtual machine or communicatively coupled to a virtual machine residing on an IoT device, a physical device that may transmit data, or invoked from the cloud on a physical server to dynamically generate daughter and virtual scripts encapsulated in virtual machines or other virtual computing environment such as containers, to form atom scripts, when triggered by a request to send or receive data. The combination of atom scripts create unique molecule scripts, built on demand from a request, to dynamically process data in a module like fashion and share data across IoT devices, sensors. The combination of atom scripts may also make requests locally and remotely and dynamically in a virtual computing environment.

The mother script may blast, by dynamically generating, spawning or invoking, several atom daughter scripts, each embedded within their own microscopic virtual machines, containing at least an operating system and a set of adaptive instructions, at once to process in parallel or in serial fashion from various datacenters across the globe in various computing environments and different written languages. One or more these actions may occur based on a data request.

In some embodiments, atom scripts may be programmed to have an affinity to bond or connect with other atom scripts to capture data, share data, and or process data, to form molecule scripts. The data stream of big data may be broken into smaller pieces and captured across a chain of atom scripts, and stored in each atom's virtual database or virtual storage, like a protein or DNA molecule, where the virtual atoms can SSH or similar method, into each other to transfer or share data.

The microscopic virtual machines of the atom scripts, containing, for example, a Linux operating system and a web script, may not allow larger malware to fit inside nor allow the malware to execute due to their stripped down computing environment of the virtual machine.

In one embodiment, the mother script, which may reside on an IoT device may also dynamically generate, spawn, or invoke inert virtual atoms integrated with third party APIs, which notify of any intrusions or changes to the computing environment. Inert or static virtual atoms or machines do not spawn, such as in virtual atoms embedded with just third party APIs, in one embodiment. This notification may be made to the mother, daughter, virtual, decrypt, and receptor scripts to change their configuration settings in some embodiments. The mother script may also then dynamically generate, spawn, or invoke another set of daughter, virtual, decrypt, and receptor scripts of a different configuration with more robust security.

In some embodiments, the mother script randomly selects an encryption algorithm for the daughter or virtual script to encrypt the data and dynamically generates a corresponding decryption atom encapsulated in its own virtual machine or other virtual computing environment, separate from the computing environments of the other atom scripts.

The receptor script may be a daughter script encapsulated in a virtual machine or other virtual computing environment, written in PHP, Perl, JavaScript, HTML5, or Ruby. The receptor script may wait for a specific sequence of events, triggers, and data from the atom scripts and molecule scripts to deliver the decryption agent encapsulated in a virtual machine and to allow entry and validation to other web services, programs, scripts, third party computerized systems via a RESTful API (Application Programming Interface). The receptor script may also act as a gateway to the enterprise database system or other computerized system.

The atom scripts and molecule scripts may process in parallel or work in conjunction with each other to notify the receptor script when each script finishes its assigned task. In some embodiments, each script may self-destruct when it finishes processing its assigned task.

In some embodiments, the receptor script may receive data from an atom or molecule script, validates, decrypts, and transmits or stores the data to other computerized systems via APIs for integration or storage on a global computing environment. The receptor then sends a request to the other atom and molecule scripts that may still be processing to self-destruct. The receptor self-destructs when it is finished processing. The atom, molecule, and receptor scripts are destroyed or closed when finished processing. This allows one to take advantage of the global virtual computing environment infrastructure, where one datacenter may have more resources available for processing than another at any given time.

In another embodiment, the mother script embedded in a virtual machine residing on an IoT device dynamically generates, spawns, or invokes several virtual atoms to capture small pieces of data from a request, randomly selects an encryption algorithm on the fly, encrypts the data, and stores the encrypted data in the cloud, where all virtual atoms self-destruct when finished processing. The mother script dynamically generates, spawns, or invokes another set of virtual atoms to retrieve the encrypted data from the cloud, decrypts the data via a decrypt atom, and integrates the data into an enterprise storage system or other computerized system. The virtual atoms and the decrypt atom may be destroyed or closed by themselves when finished processing.

There may be more than one receptor script or receptor atom script. The atoms may be embedded onto sensors or IoT devices. There may be more than one mother script or mother atom script. The mother script or mother atom script may be embedded on sensors, virtual reality devices, or IoT devices. There may be an electron cloud of data or data cloud of atom scripts, consisting of hundreds or thousands of data points encapsulated individually in each atom script. There may be more than one receptor script or receptor atom scripts, which reside in a virtual computing environment, and may contain Agent. Decrypt embedded within its own virtual memory or virtual database, where Agent Decrypt may also be encapsulated within another virtual computing environment, such as a virtual machine.

Virtualized computerized components include automobility (vehicle IoT) components, software defined networking (SDN) components, i.e. virtual routers, virtual switches, virtual network controllers, virtual gateways, etc., and virtual computing hardware, software and services, which reside on a physical server.

The atom scripts may contain valences or the number of openings that it can use to connect to other virtual atoms. For example, an atom script with a valence of 4, may only connect to a maximum of 4 other atom scripts. The virtual atoms may be frozen or solid to not allow any changes to its configuration and processes.

Each virtual atom may contain an API to another system, such as a cognitive computing software as a service. The virtual atoms spontaneously and dynamically combine, break apart, and recombine with other very disparate virtual atoms in a very diverse global virtual computing ecosystem environment consisting of cognitive computing virtual atoms, storage virtual atoms, SDN virtual atoms, enterprise database virtual atoms, etc., driven by data. The process of creating, combining, breaking, recombining, and destroying of virtual atoms and virtual molecules may be transient and conducted in a transition state, which is a temporary virtual state and is an ephemeral process.

Figure 8:
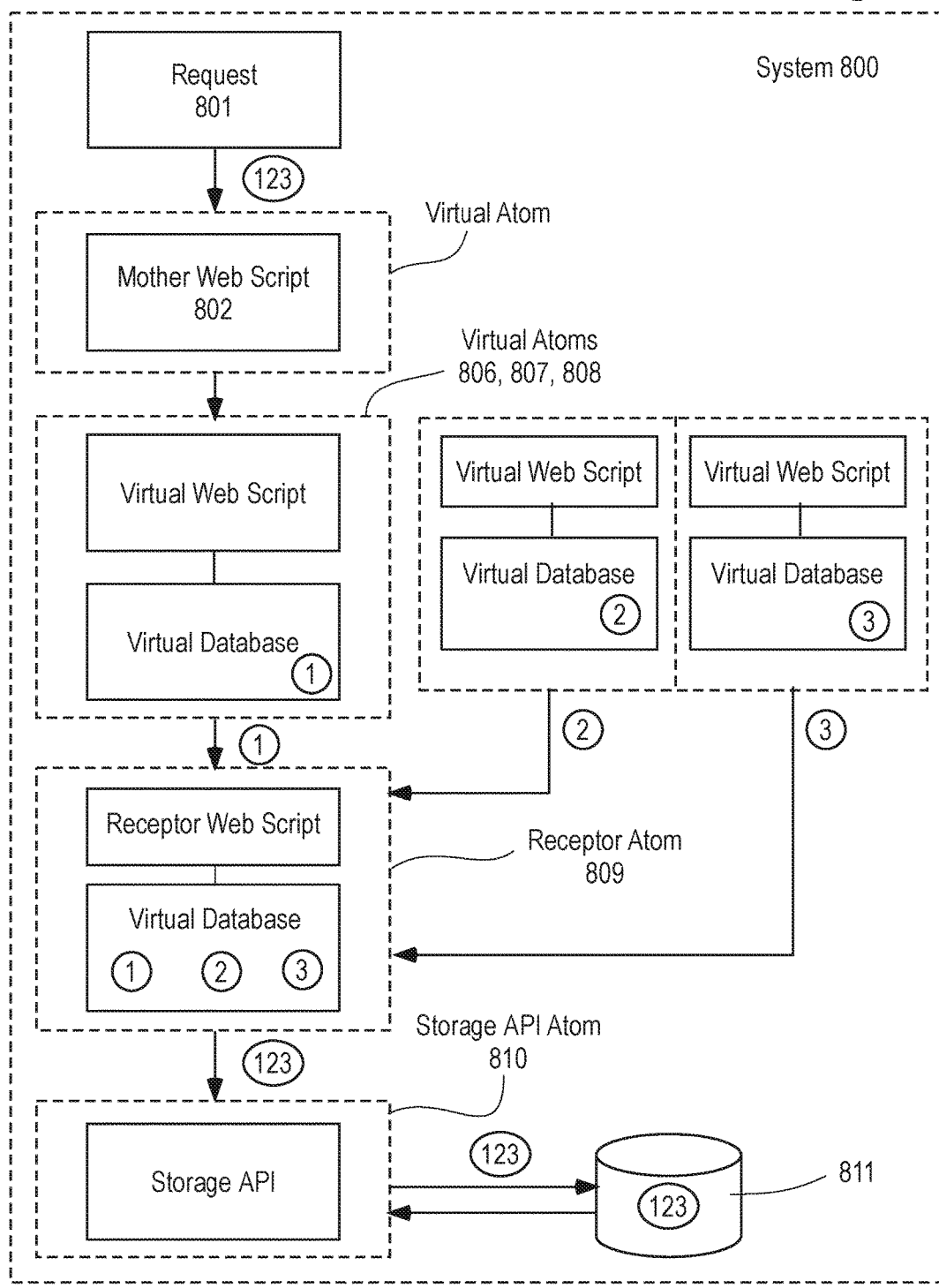

FIG. 8 includes a system 800 that includes a request 801 that is a piece of data that may be from an end user, IoT device, or system and is indicated as a string "123." The system 800 may include a web script generator 802 to generate one or more mother scripts 802 that spawns or invokes one or more virtual atoms 806-808 that may be used to receive a piece of the data, where each atom is assigned a task. As shown, each piece of the data "123" is individually encapsulated and stored in virtual memory of the virtual atoms 806-808, as strings, "1", "2", and "3", respectively. Each virtual atom may be its own virtual machine having executable code to perform one or more functions including, but not limited to, capturing, encapsulating, and operating on data. Each virtual atom or machine may include a virtual web script and/or virtual database generated by the web script generator 802. Web script generator may include a processor and executable code that is used to generate or spawn a web script similar to block 25.

In one embodiment, a receptor atom 809 may be configured to act as a gateway to one or more legacy databases. The receptor atom 809 may collect and decrypt the data from the atoms 806-808 and reassembles the resultant collection of strings, "1", "2", and "3," into a single string "123". The receptor atom itself a virtual machine may be spawned or invoked by the mother script 802 or by another mother script (not shown). The receptor atom 809 may also include its own script and virtual database.

In one embodiment, the receptor atom 809 may be configured to format the data for use by the storage API atom 810. In one example, the format may be SQL, XML, or JSON. The atom 810 may be used to store the data into a physical database 811. The atom 810 may be configured to appropriately format the data for the different types of databases.

Figure 9:
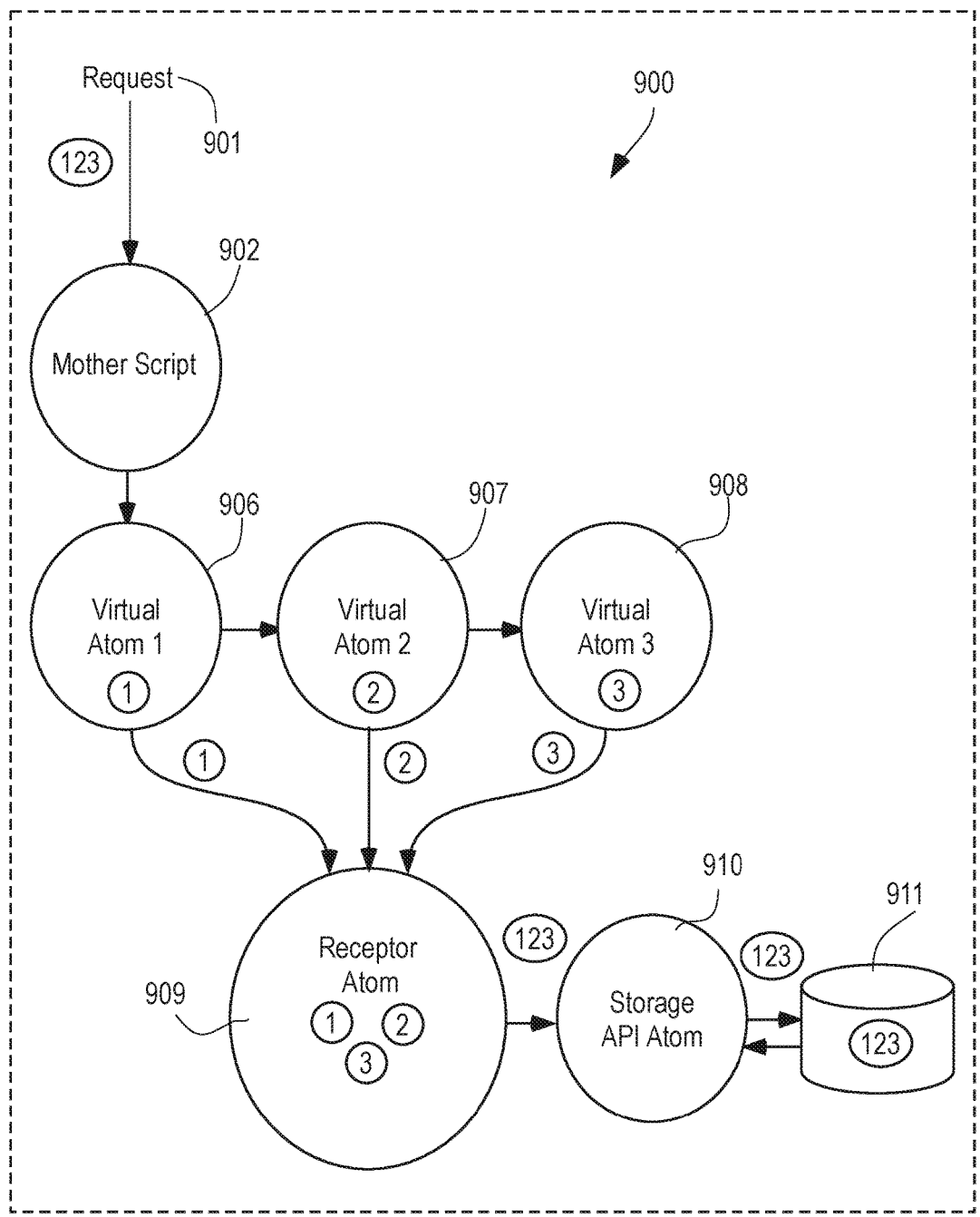

FIG. 9 shows a system 900 in an embodiment in which a mother script 902 spawns or invokes a virtual atom 906, which may spawn atom 907, which may spawn atom 908 and the like. Elements 901-902 are similar to elements 801-802 and atoms 906-908 are similar to atoms 806-808. Additionally, elements 909-911 are the similar to elements 809-811.

Figure 10:
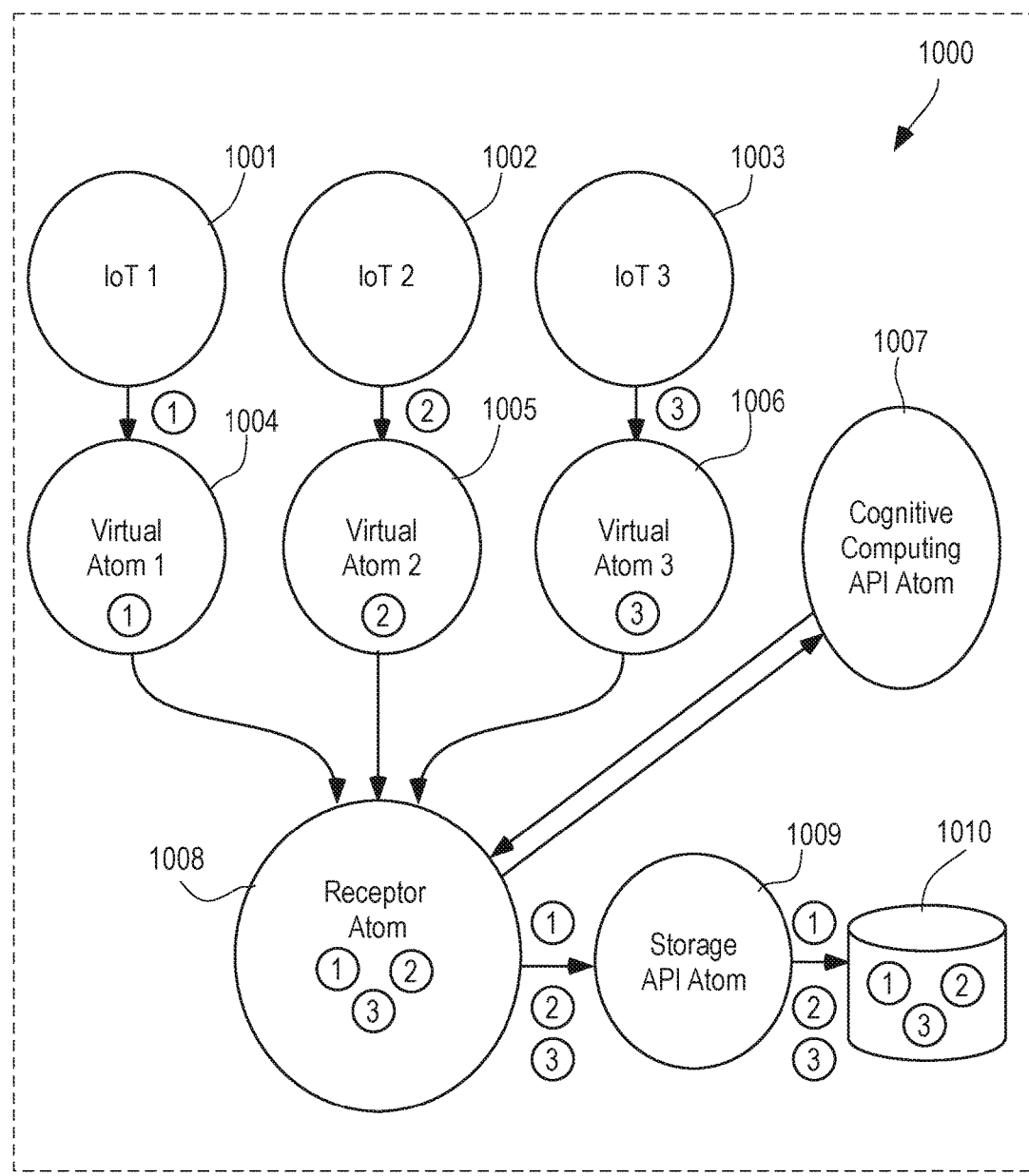

FIG. 10 illustrates a system 1000 including IoT devices 1001-1003 that may be the same device or different devices.

In one example, the IoT device may be a sensor and/or include a MCU (microcontroller unit). Each IoT may be include a mother script residing on the IoT device or the mother script may be invoked or spawned from the cloud. Similar to atoms 906-908, the atoms 1004-1006 may receive pieces of data and the receptor 1008 collects the data and may decrypt the collection of data strings "1", "2", and "3", where they are stored as data strings "1", "2", and "3". In one embodiment, the receptor atom 1008 may be configured to communicate with a cognitive computing API atom 1007 that may be programmed with artificial intelligence. In one embodiment, the atom 1007 may process data from the receptor atom 1008 in real-time. Elements 1009 and 1010 may be substantially similar to elements 910 and 911.

Figure 11:
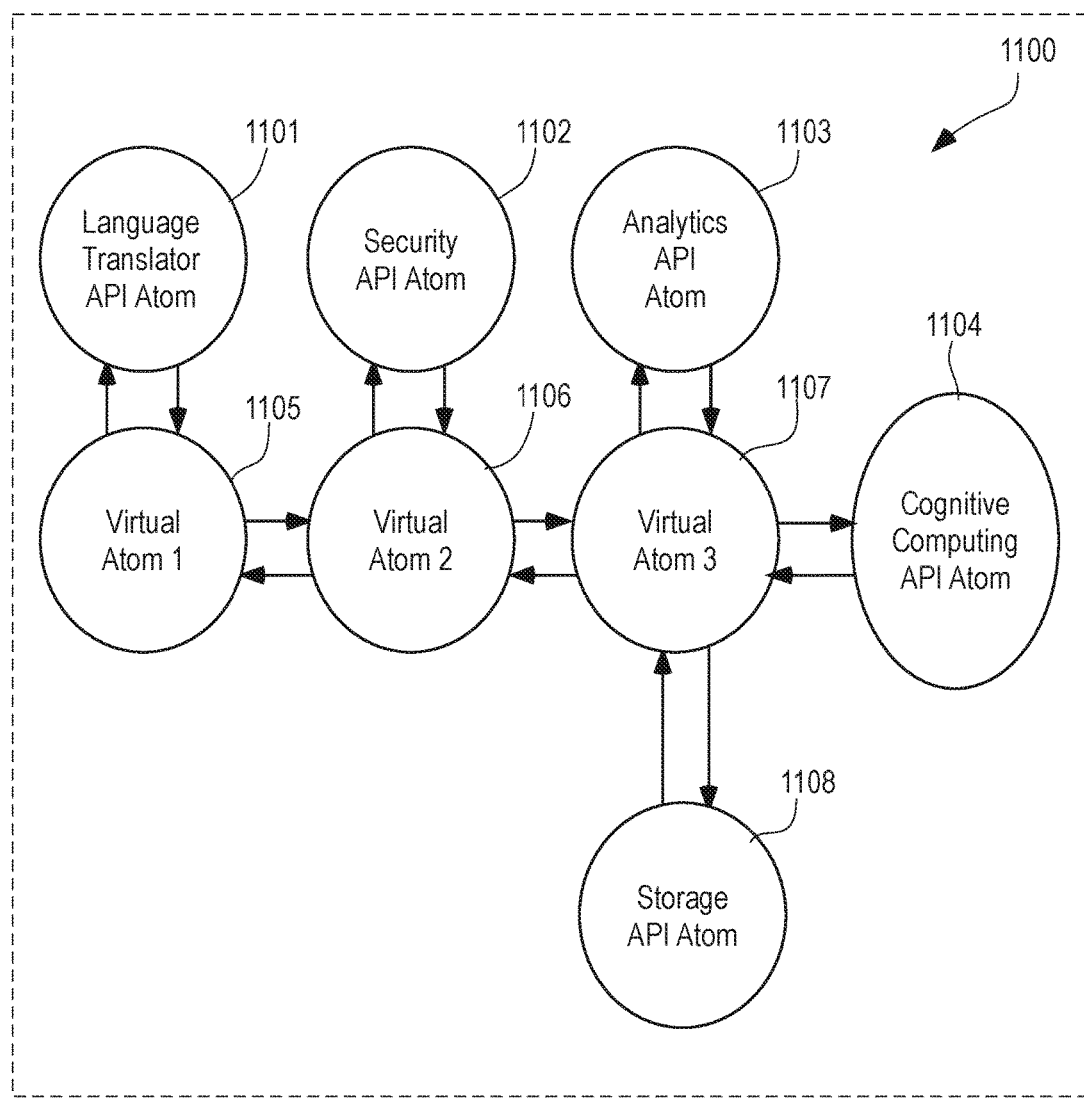

FIG. 11 illustrates a molecule 1100 which may represent a computer system. The system 1100 may include one or more virtual atoms or machines 1105-1108 that may be coupled to one or more atoms 1101-1104. The machines 1105-107 may be similar to atoms 1004-1006. In one embodiment, the system 1100 may include any number of APIs atoms or virtual machines depending on the system requirements. The APIs atoms may include a language translator API atom, a security API atom, an analytics API atom, and a cognitive computing API atom. Each atom 1101-1104 may be any other atom or machine that represents instruction sets that perform a specific function and that may be called via an API call embedded in a web script. The atoms 1101-1104 may be third party pieces of code, wrapped in a web script and encapsulated in a virtual machine that can be invoked or coupled with other virtual atoms and virtual molecules to share or transfer data from a request.

The technology of combining the API economy into very disparate and diverse virtual atoms and virtual molecules provides networks of complex diverse ephemeral computerized systems that can be built spontaneously and dynamically on demand from a request driven by data. These virtual atoms and virtual molecules, containing adaptive instruction sets, are cybersecurity catalysts, used to secure the transmission of data in a cloud based environment, to disparate systems by coupling otherwise unconnected systems or networks. The cybersecurity catalysts facilitate the creation or synthesis of adaptive ephemeral computer systems and networks that provide adaptive functionality by combining and recombining with virtual atoms and virtual molecules from the request, to secure the transmission of data in a cloud based environment. The cybersecurity catalysts are destroyed or closed when finished processing.

It should be understood that the various techniques described herein may be implemented in connection with hardware (including virtual hardware) or software or, where appropriate, with a combination of both. Thus, the methods and apparatus of the presently disclosed subject matter, or certain aspects or portions thereof, may take the form of program code (i.e., instructions) embodied in tangible media, such as flash drives, CD-ROMs, hard drives, or any other machine-readable storage medium where, when the program code is loaded into and executed by a machine (or virtual machine), such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices and/or virtual machines. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer implemented method for providing a customized network associated with an application service provider, the method comprising:
   receiving a first request from an input device;
   generating, spawning or invoking a mother script in a virtual computing environment residing on a physical server that dynamically generates, spawns, or invokes at least one virtual machine embedded with one or more daughter scripts or virtual scripts containing adaptive instruction sets based on the first request, in the form of one or more virtual atoms in the virtual computing environment,
   where each virtual atom having at least one assigned task and is allowed to connect to other virtual atoms to create one or more virtual computing systems or networks, in the form of one or more virtual molecules, to one of share data, processes, resources, and adaptive instruction sets, to dynamically process data and/or execute complex tasks based on, at least, a combination of atom scripts that makes the first and a second request, in a virtual computing environment residing on a physical server,
   wherein the one or more virtual atoms or one or more virtual molecules are destroyed by themselves such that the daughter script or virtual script self-destructs when it is finished processing.

2. The method of claim 1, wherein the at least one virtual machine embedded with adaptive instruction sets, resides on one of a microcontroller, sensor, USB flash drive, chip, module, server, and a device associated with the Internet of Things (IoT).

3. The method of claim 1, wherein programming containing adaptive instruction sets in one of embedded in a virtual machine or not embedded in a virtual machine, resides on one of a microcontroller, sensor, USB flash drive, chip, module, and a device associated with the Internet of Things (IoT) and invokes one or more mother scripts in the virtual computing environment residing on a physical server.

4. The method of claim 1, wherein the virtual machines encapsulate data in one of the same language and different languages.

5. The method of claim 1, wherein at least one set of adaptive instructions encapsulated within a virtual machine, spawns, generates, or invokes one or more other sets of adaptive instructions encapsulated in one or more other virtual machines.

6. The method of claim 1, wherein at least one decryption agent, containing adaptive instruction sets, encapsulated within a virtual machine on a virtual computing environment residing on a physical server is invoked, spawned, or generated from a request to decrypt data from each virtual atom or virtual molecule.

7. The method of claim 6, wherein the decryption agent encapsulated within a virtual machine in the virtual computing environment residing on a physical server is dynamically generated by a set of adaptive instructions based on a request.

8. The method of claim 1, wherein the data from each virtual atom is stored within its own virtual memory or virtual database.

9. The method of claim 1, wherein the data is received and reassembled by a receptor, in the form of a virtual atom or virtual molecule, containing adaptive instruction sets encapsulated within a virtual machine, in the virtual computing environment residing on a physical server.

10. The method of claim 9, wherein the receptor virtual atom or receptor virtual molecule invokes an API in the virtual computing environment residing on a physical server to store the data into a physical database of a physical server.

11. The method of claim 1, wherein one or more of the virtual atoms or virtual molecules in a virtual computing environment residing on a physical server, including a third party application embedded within the virtual machine.

12. The method of claim 1, wherein the virtual machines are in a cloud-based environment.

13. The method of claim 1, wherein the virtual atoms or virtual molecules, containing adaptive instruction sets encapsulated within virtual machines, combine to form repeatable functional groups, in the form of additional virtual atoms or virtual molecules, chained together to capture a first set of data that is subsequently broken into small pieces of second data sequentially, across the repeatable functional group chain of additional virtual atoms or virtual molecules.

14. The method of claim 1, wherein each virtual machine includes its own operating system and virtual database.

15. The method of claim 1, wherein data is captured from an IoT device and the data is stored or transmitted into a disparate computing environment.

16. The apparatus of claim 1, wherein programming containing adaptive instruction sets in one of embedded in a virtual machine or not embedded in a virtual machine, resides on one of a microcontroller, sensor, USB flash drive, chip, module, and a device associated with the Internet of Things (IoT) and invokes one or more mother scripts in the virtual computing environment residing on a physical server.

17. The apparatus of claim 1, wherein the virtual machines encapsulate data in one of the same language and different languages.

18. The apparatus of claim 1, wherein at least one set of adaptive instructions encapsulated within a virtual machine, spawns, generates, or invokes one or more other sets of adaptive instructions encapsulated in one or more other virtual machines.

19. An apparatus comprising:
a processor device and a memory; and
code executable by the processor device, the code including programming for providing a customized network associated with an application service provider to:
receive a first request from an input device;
generate, spawn, or invoke a mother script in a virtual computing environment residing on a physical server that dynamically generates, spawns, or invokes at least one virtual machine embedded with one or more daughter scripts or virtual scripts containing adaptive instruction sets based on the first request, in the form of one or more virtual atoms in the virtual computing environment,
where each virtual atom having at least one assigned task and is allowed to connect to other virtual atoms to create one or more virtual computing systems or networks, in the form of one or more virtual molecules, to one of share data, processes, resources, and adaptive instruction sets, to dynamically process data and/or execute complex tasks based on, at least, a combination of atom scripts that makes the first and a second request, in a virtual computing environment residing on a physical server,
wherein the one or more virtual atoms or one or more virtual molecules are destroyed by themselves such that the daughter script or virtual script self-destructs when it is finished processing.

20. The apparatus of claim 19, wherein the at least one virtual machine embedded with adaptive instruction sets, resides on one of a microcontroller, sensor, USB flash drive, chip, module, server, and a device associated with the Internet of Things (IoT).

* * * * *